(12) United States Patent
Liu et al.

(10) Patent No.: US 12,389,370 B2
(45) Date of Patent: Aug. 12, 2025

(54) CHANNEL TRANSMISSION METHOD, CHANNEL RECEIVING METHOD, COMMUNICATION NODE, AND STORAGE MEDIUM

(71) Applicant: ZTE Corporation, Guangdong (CN)

(72) Inventors: Kun Liu, Guangdong (CN); Bo Dai, Guangdong (CN); Huiying Fang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 378 days.

(21) Appl. No.: 18/298,923

(22) Filed: Apr. 11, 2023

(65) Prior Publication Data
US 2023/0247585 A1    Aug. 3, 2023

Related U.S. Application Data

(63) Continuation of application No. PCT/CN2022/074156, filed on Jan. 27, 2022.

(30) Foreign Application Priority Data

Apr. 2, 2021  (CN) .......................... 202110363329.4

(51) Int. Cl.
  *H04W 68/02*   (2009.01)
  *H04W 76/28*   (2018.01)
  *H04L 5/00*    (2006.01)

(52) U.S. Cl.
  CPC ........... *H04W 68/02* (2013.01); *H04W 76/28* (2018.02); *H04L 5/0012* (2013.01)

(58) Field of Classification Search
  None
  See application file for complete search history.

(56) References Cited

U.S. PATENT DOCUMENTS 10,862,531 B2   12/2020   Park et al.
11,076,379 B2    7/2021   Liu et al.
(Continued)

FOREIGN PATENT DOCUMENTS

| CN | 101414872 A | 4/2009 |
|---|---|---|
| CN | 102917444 A | 2/2013 |

(Continued)

OTHER PUBLICATIONS

Japanese office action issued in JP Patent Application No. 2023-559745, dated Aug. 1, 2024, 6 pages. English translation included.

(Continued)

*Primary Examiner* — Frantz Bataille
(74) *Attorney, Agent, or Firm* — Perkins Coie LLP

(57) ABSTRACT

Provided are a channel transmission and reception method, a communication node, and a storage medium. The channel transmission method includes determining a physical uplink control channel (PUCCH) frequency hopping pattern, where the PUCCH frequency hopping pattern is one of preset frequency hopping patterns, and the preset frequency hopping patterns include at least two types of frequency hopping patterns; where in a first-type frequency hopping pattern, a PUCCH before and after hopping occupies adjacent time domain symbols, and in a second-type frequency hopping pattern, an interval exists between time domain symbols occupied by the PUCCH before and after the hopping; and transmitting a PUCCH corresponding to the PUCCH frequency hopping pattern according to the PUCCH frequency hopping pattern.

11 Claims, 10 Drawing Sheets

(56) References Cited

U.S. PATENT DOCUMENTS

| | | | |
|---|---|---|---|
| 11,089,570 | B2 | 8/2021 | Yi et al. |
| 11,950,290 | B2 | 4/2024 | Myung et al. |
| 2016/0044605 | A1 | 2/2016 | Vajapeyam et al. |
| 2016/0330791 | A1 | 11/2016 | Vajapeyam et al. |
| 2019/0028999 | A1 | 1/2019 | Yerramalli et al. |
| 2020/0163048 | A1* | 5/2020 | Kim ............... H04W 72/12 |
| 2020/0229133 | A1* | 7/2020 | Yi ............... H04W 76/28 |
| 2022/0116908 | A1 | 4/2022 | Chun |
| 2023/0354266 | A1 | 11/2023 | Xiang et al. |
| 2023/0422210 | A1 | 12/2023 | Li et al. |

FOREIGN PATENT DOCUMENTS

| | | | |
|---|---|---|---|
| CN | 106961729 | A | 7/2017 |
| CN | 108702732 | A | 10/2018 |
| CN | 109246818 | A | 1/2019 |
| CN | 109923915 | A | 6/2019 |
| CN | 110140318 | A | 8/2019 |
| EP | 3253132 | A1 | 12/2017 |
| IN | 201727001390 | A | 2/2017 |
| WO | 2014113074 | A1 | 7/2014 |
| WO | 2016140274 | A1 | 9/2016 |
| WO | 2017049625 | A1 | 3/2017 |
| WO | 2017121197 | A1 | 7/2017 |
| WO | 2017173158 | A1 | 10/2017 |
| WO | 2018128855 | A1 | 7/2018 |
| WO | 2018231030 | A1 | 12/2018 |
| WO | 2020032727 | A1 | 2/2020 |
| WO | 2020138985 | A1 | 7/2020 |
| WO | 2022151604 | A1 | 7/2022 |
| WO | 2022193134 | A1 | 9/2022 |

OTHER PUBLICATIONS

Ericsson, "Discussion of eDRX for RedCap," 3GPP TSG-RAN WG2 #113bis-e, Tdoc R2-2102965, Electronic meeting, Apr. 12-20, 2021, 9 pages.
Australian notice of acceptance issued in AU Patent Application No. 2022247583, dated Apr. 17, 2025, 3 pages.
Chinese office action issued in CN Patent Application No. 202410279022.X, dated Oct. 25, 2024, 13 pages. English translation included.
Australian second examination report issued in AU Patent Application No. 2022247583, dated Dec. 6, 2024, 4 pages.
Japanese office action issued in JP Patent Application No. 2023-559745, dated Apr. 25, 2025, 4 pages. English translation included.
Japanese office action issued in JP Patent Application No. 2023-559745, dated Feb. 21, 2025, 8 pages. English translation included.
Chinese office action issued in CN Patent Application No. 202410279022.X, dated Jan. 13, 2025, 9 pages. English translation included.
European Communication pursuant to Article 94(3) EPC issued in EP Patent Application No. 22778347.9, dated Apr. 14, 2025, 14 pages.
International Search Report in International Application No. PCT/CN2022/074156, mailed on Mar. 29, 2022, 8 pages with translation.
Ericsson, "Potential UE complexity reduction features for RedCap," 3GPP TSG-RAN WG1 Meeting #103-e, R1-2007529, Online, Oct. 26-Nov. 13, 2020, 61 pages.
ETSI TS 136 300, V16.4.0, Jan. 2021, LTE; Technical Specification, LTE; Evolved Universal Terrestrial Radio Access (E-UTRA) and Evolved Universal Terrestrial Radio Access Network (E-UTRAN); Overall description; Stage 2, 3GPP TS 36.300 version 16.4.0 Release 16, 403 pages.
ETSI TS 136 304 V16.3.0, Jan. 2021, Technical Specification, LTE; Evolved Universal Terrestrial Radio Access (E-Utra); User Equipment (UE) procedures in idle mode, 3GPP TS 36.304 version 16.3.0 Release 16, 66 pages.
Australian examination report issued in AU Patent Application No. 2022247583, dated Sep. 11, 2024, 6 pages.
3GPP TR 38.875, V17.0.0, (Mar. 2021), Technical Report, 3rd Generation Partnership Project; Technical Specification Group Radio Access Network; Study on support of reduced capability NR devices (Release 17), 135 pages.
Nokia et al., "Revised WID on support of reduced capability NR devices," 3GPP TSG RAN Meeting #91e, RP-210918, Revision of RP-210894, Electronic Meeting, Mar. 22-26, 2021, 6 pages.
Chinese office action issued in CN Patent Application No. 202410279022.X, dated Aug. 16, 2024, 7 pages. English translation included.
European Search Report issued in EP Patent Application No. 22778347.9, dated Sep. 9, 2024, 24 pages.
ZTE Corporation et al., "Correction on paging narrowband selection," 3GPP TSG-RAN2 Meeting #113-e, R2-2102159, Online, Jan. 25, 2021-Feb. 5, 2021, 4 pages.
ZTE Corporation et al., "Discussion on paging resources determination for eMTC," 3GPP TSG-RAN WG2 Meeting #114-e E-meeting, R2-2106285, Online, May 19-27, 2021, 8 pages.
International Preliminary Report on Patentability issued in International Patent Application No. PCT/CN2022/074156, dated Oct. 3, 2023, 4 pages.
Chinese Notification to Complete Formalities of Registration issued in CN Patent Application No. 202410279022.X, dated Mar. 27, 2025, 11 pages. English translation included.
Qualcomm Incorporated, "Adding PTW length to S2 paging message in case of eDRX," SA WG2 Meeting #114, S2-161750, Apr. 11-15, 2016, Sophia Antipolis, France, 2 pages.
Ericsson, "DRX in idle state," 3GPP TSG-RAN WG2#99, Tdoc R2-1708177, Berlin, Germany, Aug. 21-25, 2017, Revision of R2-1706515, 4 pages.
Ericsson, "Extended DRX for RRC_IDLE and RRC_INACTIVE for NR RedCap UE," 3GPP TSG-RAN WG2 #113e, R2-2100986, Electronic meeting, Jan. 25-Feb. 5, 2021, 8 pages.
Qualcomm Incorporated, "Power saving enhancements for RedCap UEs," 3GPP TSG-RAN WG2 Meeting #113-e, R2-2100312, Online, Jan. 25-Feb. 5, 2021, 5 pages.
Xiaomi Communications, "Discussion on e-DRX for Redcap Devices," 3GPP TSG-RAN WG2 Meeting #113 electronic, R2-2100344, Online, Jan. 25-Feb. 5, 2021, 5 pages.
Convida Wireless, "Impact of eDRX PTW for Reduced Capability NR Devices," 3GPP TSG-RAN WG2 Meeting #113 electronic, R2-2101797, Online Meeting, Jan. 25-Feb. 5, 2021, 2 pages.
OPPO, "Consideration on eDRX for RedCap UEs," 3GPP TSG-RAN WG2 Meeting #113 electronic, R2-2100156, Online, Jan. 25-Feb. 5, 2021, 2 pages.
Rapporteur (Ericsson), "Concluding the RedCap SI in RAN2," 3GPP TSG-RAN WG2 #113e, Tdoc R2-2100983, Electronic meeting, Jan. 25-Feb. 5, 2021, 7 pages.
Japanese notice of allowance issued in JP Patent Application No. 2023-559745, dated Jun. 11, 2025, 4 pages. English translation included.
ZTE Corporation et al., "Discussion on eDRX for RedCap UE," 3GPP TSG-RAN WG2 Meeting #113 bis electronic, R2-2103039, Online, Apr. 12-Apr. 20, 2021, 6 pages.

* cited by examiner

Determine a physical uplink control channel (PUCCH) frequency hopping pattern, where the PUCCH frequency hopping pattern is one of preset frequency hopping patterns, and the preset frequency hopping patterns include at least two types of frequency hopping patterns; where in a first-type frequency hopping pattern, a PUCCH before and after hopping occupies adjacent time domain symbols, and in a second-type frequency hopping pattern, an interval exists between time domain symbols occupied by the PUCCH before and after the hopping ⎯110

Transmit a PUCCH corresponding to the PUCCH frequency hopping pattern according to the PUCCH frequency hopping pattern ⎯120

FIG. 1

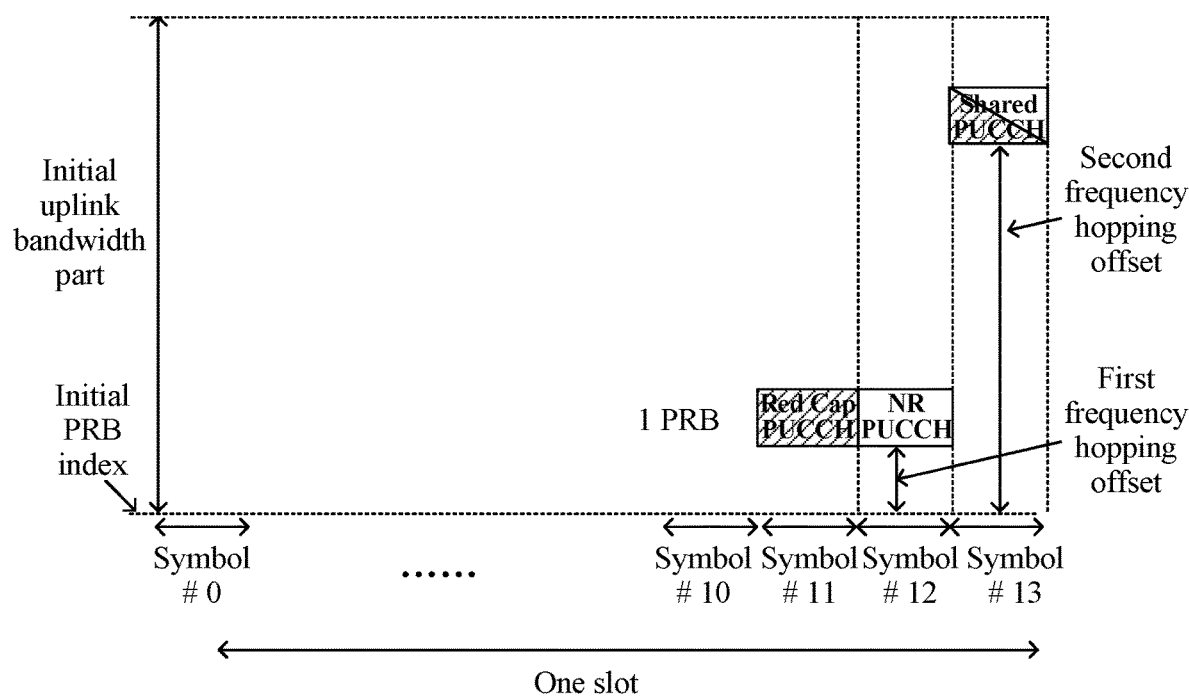

FIG. 2

CHANNEL TRANSMISSION METHOD, CHANNEL RECEIVING METHOD, COMMUNICATION NODE, AND STORAGE MEDIUM

CROSS-REFERENCE TO RELATED APPLICATIONS

This application is a continuation of International Patent Application No. PCT/CN2022/074156, filed Jan. 27, 2022, which claims priority to Chinese Patent Application No. 202110363329.4 filed with the China National Intellectual Property Administration (CNIPA) on Apr. 2, 2021, the disclosures of each of which are incorporated herein by reference in their entireties.

TECHNICAL FIELD

The present application relates to wireless communication networks, for example, a channel transmission and reception method, a communication node, and a storage medium.

BACKGROUND

In a contention-based random access (CBRA) process, a terminal (e.g. user equipment (UE)) needs to send a hybrid automatic repeat request acknowledge (HARQ-ACK) through a physical uplink control channel (PUCCH), and transmission of the PUCCH supports frequency hopping by default.

The terminal has a strong capacity or a weak capacity. For example, a terminal used in an NR system (e.g. NR UE) generally has a relatively high performance, while for application scenarios such as a wearable device, video surveillance and industrial wireless sensors, a terminal with a simplified function, that is, reduced capability user equipment (RedCap UE), can satisfy requirements. Compared with the NR UE, the RedCap UE is less capable and supports a relatively small bandwidth and fewer antennas.

If a bandwidth of an initial uplink bandwidth part (UL BWP) configured at a network side exceeds a maximum operating bandwidth supported by the terminal with a relatively weak capability, a PUCCH resource location after the frequency hopping exceeds a bandwidth range supported by this type of terminal so that this type of terminal cannot complete the transmission of the PUCCH, and thus the CBRA process fails. Therefore, a frequency hopping mechanism in the related art cannot ensure that UEs with different capabilities can complete the transmission of the PUCCH so that the reliability of the CBRA process is low.

SUMMARY

The present application provides a channel transmission and reception method, a communication node, and a storage medium, so as to ensure that a UE completes transmission of a PUCCH, thereby improving the reliability of a CBRA process.

An embodiment of the present application provides a channel transmission method. The method includes the following.

A PUCCH frequency hopping pattern is determined, where the PUCCH frequency hopping pattern is one of preset frequency hopping patterns, and the preset frequency hopping patterns include at least two types of frequency hopping patterns; where in a first-type frequency hopping pattern, a PUCCH before and after hopping occupies adjacent time domain symbols, and in a second-type frequency hopping pattern, an interval exists between time domain symbols occupied by the PUCCH before and after the hopping.

A PUCCH corresponding to the PUCCH frequency hopping pattern is transmitted according to the PUCCH frequency hopping pattern.

An embodiment of the present application further provides a channel reception method. The method includes the following.

A PUCCH frequency hopping pattern is determined, where the PUCCH frequency hopping pattern is one of preset frequency hopping patterns, and the preset frequency hopping patterns include at least two types of frequency hopping patterns. Where in a first-type frequency hopping pattern, a PUCCH before and after hopping occupies adjacent time domain symbols, and in a second-type frequency hopping pattern, an interval exists between time domain symbols occupied by the PUCCH before and after the hopping.

A PUCCH corresponding to the PUCCH frequency hopping pattern is received according to the PUCCH frequency hopping pattern.

An embodiment of the present disclosure further provides a communication node. The communication node includes a memory, a processor, and a computer program stored on the memory and running on the processor, where when executing the program, the processor performs the channel transmission method or the channel reception method.

An embodiment of the present application further provides a computer-readable storage medium which is configured to store a computer program which, when executed by a processor, performs the channel transmission method or the channel reception method.

BRIEF DESCRIPTION OF DRAWINGS

FIG. 1 is a flowchart of a channel transmission method according to an embodiment;

FIG. 2 is a schematic diagram of two types of frequency hopping patterns in which a PUCCH format is format 0 according to an embodiment;

DETAILED DESCRIPTION

Figure 3:
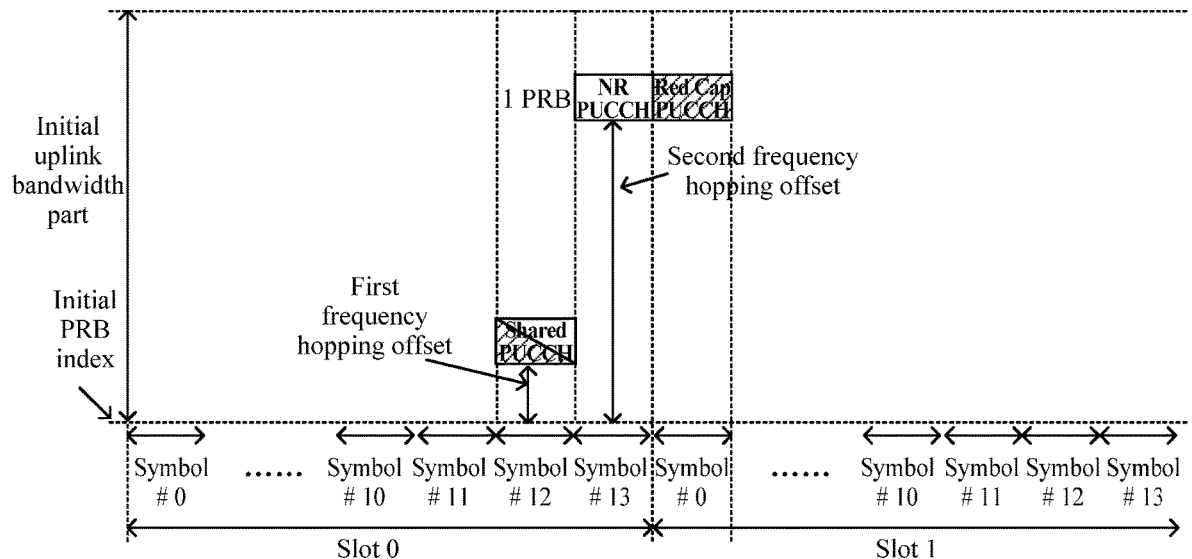
FIG. 3 is another schematic diagram of two types of frequency hopping patterns in which a PUCCH format is format 0 according to an embodiment.

The present application is described hereinafter in conjunction with drawings and embodiments. It is to be understood that the embodiments described herein are intended to illustrate the present application and not to limit the present application. It is to be noted that if not in collision, embodiments of the present application and features therein may be combined with each other in any manner. Additionally, it is to be noted that for ease of description, only part, not all, of structures related to the present application are illustrated in the drawings.

FIG. 1 is a flowchart of a channel transmission method according to an embodiment. The method is applicable to a sender of a PUCCH, for example, a UE. As shown in FIG. 1, the method provided in this embodiment includes steps 110 and 120.

In step 110, a PUCCH frequency hopping pattern is determined, where the PUCCH frequency hopping pattern is one of preset frequency hopping patterns, and the preset frequency hopping patterns include at least two types of frequency hopping patterns. Where in a first-type frequency hopping pattern, a PUCCH before and after hopping occupies adjacent time domain symbols, and in a second-type frequency hopping pattern, an interval exists between time domain symbols occupied by the PUCCH before and after the hopping.

In step 120, a PUCCH corresponding to the PUCCH frequency hopping pattern is transmitted according to the PUCCH frequency hopping pattern.

In the channel transmission method provided in the embodiments of the present application, a PUCCH frequency hopping pattern is determined from at least two types of frequency hopping patterns for PUCCH transmission, where in the first-type frequency hopping pattern, no interval for the UE (NR UE) with a relatively strong capacity to quickly complete the hopping and transmission of the PUCCH exists between PUCCHs before and after the hopping. In the second-type frequency hopping pattern, an interval exists between PUCCHs before and after the hopping, where the interval is used for the UE (RedCap UE) with a relatively weak capacity to perform radio frequency adjustment so as to support a PUCCH resource location after the hopping. In this manner, the at least two types of frequency hopping patterns are configured so as to ensure the PUCCH transmission by UEs with different capacities and the reliability of a CBRA process.

In an embodiment, step 110 includes the following.

The second-type frequency hopping pattern is used as the PUCCH frequency hopping pattern according to first signaling at a network side. In the case where a set condition is satisfied, the second-type frequency hopping pattern in the preset frequency hopping patterns is used as the PUCCH frequency hopping pattern.

The set condition includes at least one of the following.

A bandwidth of an initial uplink bandwidth part exceeds a maximum operating bandwidth supported by a terminal.

The bandwidth of the initial uplink bandwidth part exceeds a value configured at the network side.

The bandwidth of the initial uplink bandwidth part exceeds a default value.

In this embodiment, the UE may use a frequency hopping pattern as the PUCCH frequency hopping pattern for transmitting the PUCCH according to the first signaling at the network side or according to the set condition. For example, through the first signaling, the network side may instruct the NR UE to use the first-type frequency hopping pattern as the PUCCH frequency hopping pattern or instruct the RedCap UE to use the second-type frequency hopping pattern as the PUCCH frequency hopping pattern.

For the RedCap UE, if the set condition is satisfied, the second-type frequency hopping pattern may be used as the PUCCH frequency hopping pattern; otherwise, the first-type frequency hopping pattern may be used as the PUCCH frequency hopping pattern. A meaning of the set condition is described as follows. The bandwidth of the initial uplink bandwidth part configured at the network side is relatively large and exceeds a bandwidth range supported by the RedCap UE in an operating frequency band. Frequency hopping within such a large bandwidth range causes the RedCap UE to fail to transmit the PUCCH. In this case, the second-type frequency hopping pattern is used as the PUCCH frequency hopping pattern of the RedCap UE, and an interval is reserved during a frequency hopping process, so as to provide guarantee for frequency hopping transmission of the RedCap UE.

In an embodiment, step 110 includes at least one of the following.

The PUCCH frequency hopping pattern is determined according to a PUCCH format and a number of the time domain symbols occupied by the PUCCH.

The PUCCH frequency hopping pattern is determined according to the PUCCH format, a number of the time domain symbols occupied by the PUCCH before the hopping, and a number of the time domain symbols occupied by the PUCCH after the hopping.

The PUCCH frequency hopping pattern is determined according to the PUCCH format, the number of the time domain symbols occupied by the PUCCH, the number of the time domain symbols occupied by the PUCCH before the hopping, and the number of the time domain symbols occupied by the PUCCH after the hopping.

The PUCCH frequency hopping pattern is determined according to the PUCCH format.

The PUCCH frequency hopping pattern is determined according to the number of the time domain symbols occupied by the PUCCH.

The PUCCH frequency hopping pattern is determined according to second signaling at a network side.

In this embodiment, the UE may determine the PUCCH frequency hopping pattern according to one or more of the PUCCH format, the number of the time domain symbols occupied by the PUCCH, the number of time domain symbols occupied by the PUCCH before the hopping, the number of the time domain symbols occupied by the PUCCH after the hopping, or the second signaling at the network side. In this embodiment, the second signaling may include one or more parameters of the PUCCH format, the number of the time domain symbols occupied by the PUCCH, the number of the time domain symbols occupied by the PUCCH before the hopping, or the number of the time domain symbols occupied by the PUCCH after the hopping. In an embodiment, the time domain symbols occupied by the PUCCH before and/or after the hopping in the second-type frequency hopping pattern are determined according to the interval.

In an embodiment, a time domain length of the interval is an integer multiple of a time domain symbol, or an integer multiple of a time domain sampling interval, or an integer multiple of a time domain measurement unit.

Optionally, the interval between the time domain symbols occupied by the PUCCH before and after the hopping in the second-type frequency hopping pattern is an integer number of time domain symbols.

In an embodiment, the second-type frequency hopping pattern satisfies: the second-type frequency hopping pattern and the first-type frequency hopping pattern being in one slot; the time domain symbols occupied by the PUCCH before the hopping in the second-type frequency hopping pattern and the time domain symbols occupied by the PUCCH before the hopping in the first-type frequency hopping pattern being different; and the time domain symbols occupied by the PUCCH after the hopping in the second-type frequency hopping pattern and the time domain symbols occupied by the PUCCH after the hopping in the first-type frequency hopping pattern being the same.

In this embodiment, two types of frequency hopping patterns are in one slot, the PUCCHs before the hopping in the two types of frequency hopping patterns occupy different time domain symbols, and the PUCCH after the hopping in the second-type frequency hopping pattern reuses the PUCCH after the hopping in the first-type frequency hopping pattern. This case is applicable to PUCCH format 0.

It is to be noted that an index of a physical resource block (PRB) occupied in a frequency domain by the PUCCH before and after the hopping may be determined according to a number of control channel elements (CCEs) in a control resource set (CORESET), an index of a first CCE of a physical downlink control channel (PDCCH), and a value of a PUCCH resource indication field given by downlink control information (DCI). In addition, the determined PRB indexes of the PUCCH before and after the hopping are all expressed relative to an index of a reference PRB, for example, reference may be made to a starting PRB in the initial uplink bandwidth part.

FIG. 2 is a schematic diagram of two types of frequency hopping patterns in which a PUCCH format is format 0 according to an embodiment. As shown in FIG. 2, one slot includes fourteen orthogonal frequency division multiplexing (OFDM) symbols, and one block represents one PRB. A box where oblique lines are located represents a PUCCH of the RedCap UE, and a box where an unfilled region is located represents a PUCCH of the NR UE.

In the first-type frequency hopping pattern, OFDM symbol #12 in one slot is used as a PUCCH symbol (that is, first hopping symbol) before the hopping, symbol #13 in the slot is used as a PUCCH symbol (that is, second hopping symbol) after the hopping, and no interval (that is, radio frequency returning) exists between the PUCCHs before and after the hopping.

In the second-type frequency hopping pattern, symbol #11 in the slot is used as the PUCCH symbol before the hopping, the symbol #12 in the slot is used as the interval, and the symbol #13 is used as the PUCCH symbol after the hopping.

In FIG. 2, one PRB on the symbol #13 needs to support simultaneous transmission of the PUCCH of the RedCap UE and the NR UE, that is, the PUCCHs after the hopping in the two types of frequency hopping patterns share a same PRB. It is to be noted that in the CBRA process, the network side (for example, gNB) must identify the RedCap UE before transmitting a fourth message (Msg4 for short, where Msg4 is transmitted by the network side to the UE and used for solving a collision problem of Msg3) to the UE; otherwise, the PUCCH symbol of the RedCap UE before the hopping cannot be accurately found.

In addition, the second-type frequency hopping pattern shown in FIG. 2 supports repeated transmission at a level of a single slot.

In an embodiment, the second-type frequency hopping pattern satisfies: the time domain symbols occupied by the PUCCH before the hopping in the second-type frequency hopping pattern and the time domain symbols occupied by the PUCCH before the hopping in the first-type frequency hopping pattern being the same and located in a same slot; and the time domain symbols occupied by the PUCCH after the hopping in the second-type frequency hopping pattern and the time domain symbols occupied by the PUCCH after the hopping in the first-type frequency hopping pattern being located in different slots.

In an embodiment, the PUCCHs before the hopping in the two types of frequency hopping patterns are located in the same slot, and the PUCCH before the hopping in the second-type frequency hopping pattern reuses the PUCCH before the hopping in the first-type frequency hopping pattern; the PUCCHs after the hopping in the two types of frequency hopping patterns are located in different slots. This case is applicable to PUCCH format 0.

FIG. 3 is another schematic diagram of two types of frequency hopping patterns in which a PUCCH format is format 0 according to an embodiment. As shown in FIG. 3, one slot includes fourteen OFDM symbols, and one block represents one PRB. A box where oblique lines are located represents a PUCCH of the RedCap UE, and a box where an unfilled region is located represents a PUCCH of the NR UE.

In the first-type frequency hopping pattern, the symbol #12 in slot 0 is used as the PUCCH symbol before the hopping, the symbol #13 in this slot is used as the PUCCH symbol after the hopping, and no interval exists between the PUCCHs before and after the hopping.

In the second-type frequency hopping pattern, the symbol #12 in this slot is used as the PUCCH symbol before the hopping; the symbol #13 in this slot is used as the interval; and symbol #0 in slot 1 is used as the PUCCH symbol after the hopping.

In FIG. 3, one PRB on the symbol #12 in the slot 0 needs to support simultaneous transmission of the PUCCH of the RedCap UE and the NR UE, that is, the PUCCHs before the hopping in the two types of frequency hopping patterns share a same PRB. It is to be noted that, in the CBRA process, the network side must identify the RedCap UE before transmitting the fourth message to the UE; otherwise, the PUCCH symbol of the RedCap UE before the hopping cannot be accurately found.

In addition, the second-type frequency hopping pattern shown in FIG. 3 supports repeated transmission at a level of two slots.

In an embodiment, the second-type frequency hopping pattern satisfies the following.

Indexes of the time domain symbols occupied by the PUCCH before the hopping in the second-type frequency hopping pattern and indexes of the time domain symbols occupied by the PUCCH before or after the hopping in the first-type frequency hopping pattern are the same and located in a same slot.

Indexes of the time domain symbols occupied by the PUCCH after the hopping in the second-type frequency hopping pattern and the indexes of the time domain symbols occupied by the PUCCH before or after the hopping in the first-type frequency hopping pattern are the same and located in different slots.

In this embodiment, the PUCCHs before the hopping in the two types of frequency hopping patterns are in the same slot, and the PUCCHs after the hopping in the two types of frequency hopping patterns are in different slots. In addition, the PUCCH before the hopping in the second-type frequency hopping pattern may reuse the PUCCH before the hopping in the first-type frequency hopping pattern or reuse the PUCCH after the hopping in the first-type frequency hopping pattern. The PUCCH after the hopping in the second-type frequency hopping pattern may reuse the PUCCH before the hopping in the first-type frequency hopping pattern or reuse the PUCCH after the hopping in the first-type frequency hopping pattern; this case is applicable to PUCCH format 0.

Figure 4:
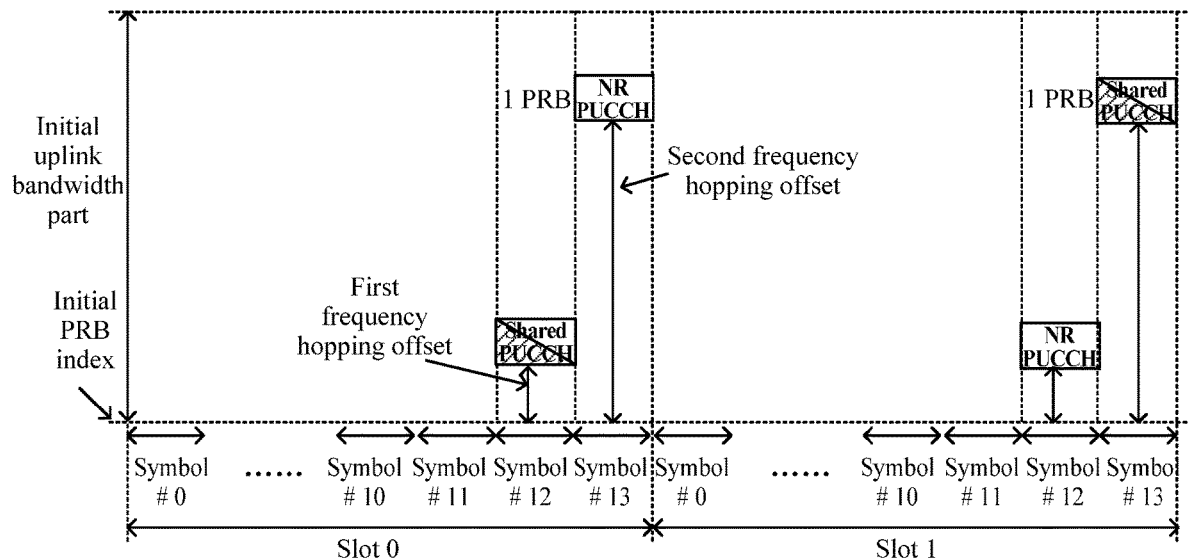
FIG. 4 is another schematic diagram of two types of frequency hopping patterns in which a PUCCH format is format 0 according to an embodiment.

FIG. 4 is another schematic diagram of two types of frequency hopping patterns in which a PUCCH format is format 0 according to an embodiment. As shown in FIG. 4, one slot includes fourteen OFDM symbols, and one block represents one PRB. A box where oblique lines are located represents a PUCCH of the RedCap UE, and a box where an unfilled region is located represents a PUCCH of the NR UE.

In the first-type frequency hopping pattern, the symbols #12 in the slot 0 and slot 1 are used as the PUCCH symbol before the hopping, the symbols #13 in the slot 0 and slot 1 are used as the PUCCH symbols after the hopping, and no interval exists between the PUCCHs before and after the hopping in each slot.

In the second-type frequency hopping pattern, the symbol #12 or symbol #13 in the slot 0 (the symbol #12 is used as an example in FIG. 4) is used as the PUCCH symbol before the hopping; the symbol #12 or symbol #13 in the slot 1 (the symbol #13 is used as an example in FIG. 4) is used as the PUCCH symbol after the hopping; symbols between symbols occupied by the PUCCH of the RedCap before and after the hopping are all used as intervals.

On this basis, the PUCCHs before the hopping in the two types of frequency hopping patterns share a same PRB, and the PUCCHs after the hopping share a same PRB. It is to be noted that, in the CBRA process, the network side must identify the RedCap UE before transmitting the fourth message to the UE; otherwise, the PUCCH symbol of the RedCap UE before the hopping cannot be accurately found.

In addition, the second-type frequency hopping pattern shown in FIG. 4 supports repeated transmission at a level of two slots.

In an embodiment, in the second-type frequency hopping pattern, the time domain symbols occupied by the PUCCH after the hopping are located in a next slot of a slot where the time domain symbols occupied by the PUCCH before the hopping are located.

In this embodiment, the time domain symbols occupied by the PUCCH before and after the hopping in the second-type frequency hopping pattern are located in adjacent slots as shown in FIG. 3 or 4, so as to increase an appropriate time domain interval.

In an embodiment, the PUCCH frequency hopping pattern is the second-type frequency hopping pattern.

The step 120 includes the following.

In the case where the PUCCH supports repeated transmission, one repeated transmission occupies one slot, and the PUCCH corresponding to the PUCCH frequency hopping pattern is transmitted according to the second-type frequency hopping pattern.

In the case where the PUCCH supports the repeated transmission, one repeated transmission occupies two slots, and the PUCCH corresponding to the PUCCH frequency hopping pattern is transmitted according to the second-type frequency hopping pattern (the second frequency hopping pattern shown in FIGS. 3 and 4).

In an embodiment, the PUCCH satisfies at least one of the following (as shown in FIGS. 2 to 4).

A PUCCH format is format 0.

The number of the time domain symbols occupied by the PUCCH equals to 2.

The number of the time domain symbols occupied by the PUCCH before the hopping equals to 1, and the number of the time domain symbols occupied by the PUCCH after the hopping equals to 1.

In an embodiment, the time domain symbols occupied by the PUCCH include a first-type time domain symbol used for transmitting a reference signal (RS) and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH before the hopping in the first-type frequency hopping pattern are the same, and the second-type time domain symbol occupied by the PUCCH before the hopping in the second-type frequency hopping pattern and the second-type time domain symbol occupied by the PUCCH before the hopping in the first-type frequency hopping pattern are different.

The first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

Figure 5:
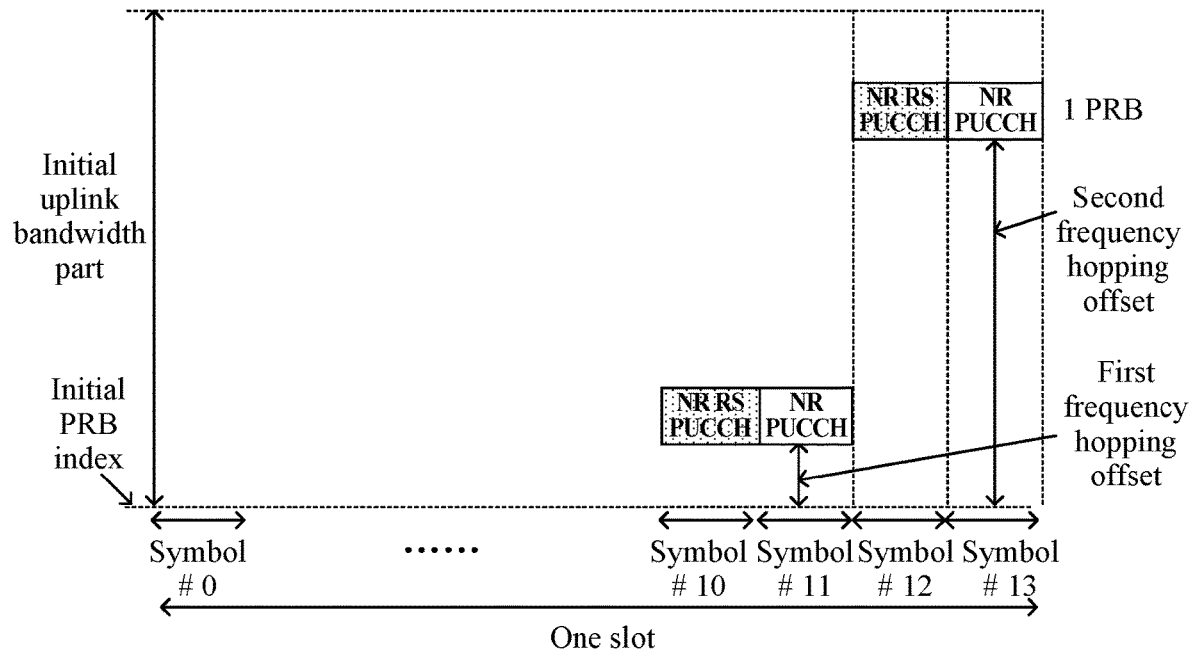
FIG. 5 is a schematic diagram of a first-type frequency hopping pattern in which a PUCCH format is format 1 and a PUCCH occupies four symbols according to an embodiment.

FIG. 5 is a schematic diagram of a first-type frequency hopping pattern in which a PUCCH format is format 1 and a PUCCH occupies four symbols according to an embodiment. As shown in FIG. 5, one slot includes fourteen OFDM symbols, and one block represents one PRB. A box where a dotted region is located represents the PUCCH used by the NR UE for transmitting the RS, and a box where an unfilled region is located represents the PUCCH used by the NR UE for carrying the uplink control information. This case is applicable to PUCCH format 1.

For the first-type frequency hopping pattern, the symbols #10 and #11 in one slot are used as PUCCH symbols before the hopping, and the symbols #12 and #13 in this slot are used as PUCCH symbols after the hopping, where the RS is transmitted on the symbol #10 and symbol #12.

Figure 6:
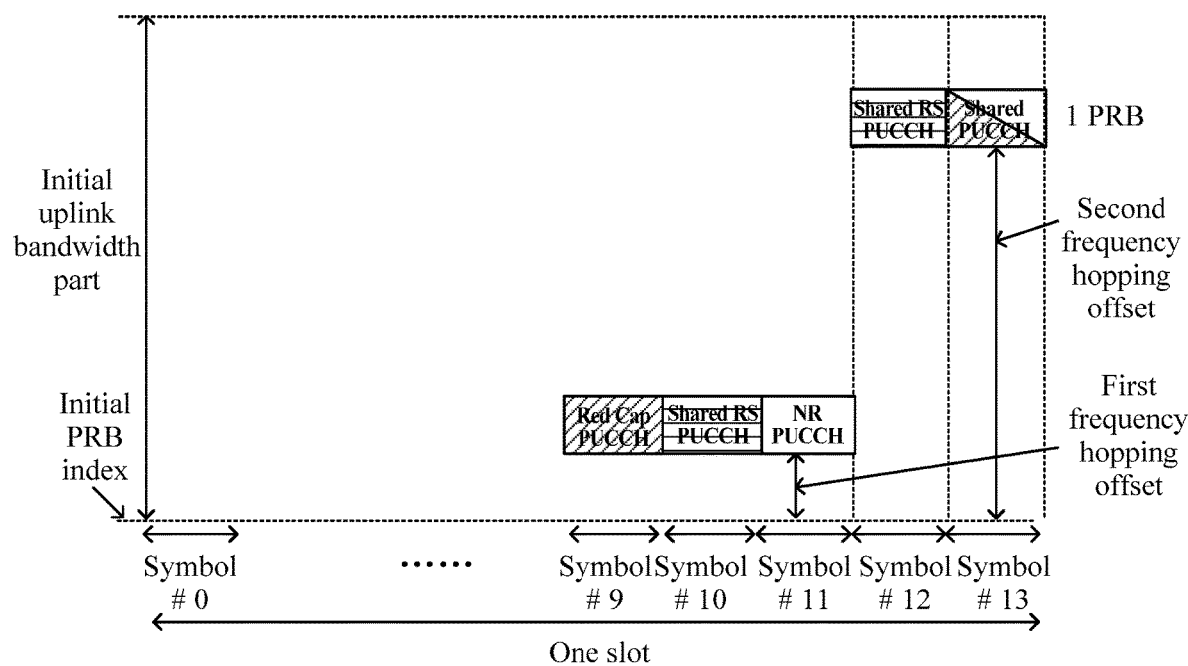
FIG. 6 is a schematic diagram of a second-type frequency hopping pattern in which a PUCCH format is format 1 and a PUCCH occupies four symbols according to an embodiment.

FIG. 6 is a schematic diagram of a second-type frequency hopping pattern in which a PUCCH format is format 1 and a PUCCH occupies four symbols according to an embodiment. As shown in FIG. 6, one slot includes fourteen OFDM symbols, and one block represents one PRB. A box where horizontal lines are located represents the PUCCH shared by the RedCap UE and the NR UE for transmitting the RS, a box where oblique lines are located represents the PUCCH used by the RedCap UE for carrying the uplink control information, and a box where an unfilled region is located represents the PUCCH used by the NR UE for carry the uplink control information. This case is applicable to PUCCH format 1.

For the second-type frequency hopping pattern, symbols #9 and #10 in one slot are used as PUCCH symbols of the RedCap before the hopping, where the RS is transmitted on the symbol #10, and the PUCCH for transmitting the RS on the symbol #10 shares the PUCCH for transmitting the RS before the hopping in the first-type frequency pattern. The PUCCH symbol of the RedCap after the hopping shares the symbols #12 and #13 with the PUCCH after the hopping in the first-type frequency hopping pattern, where the RS is transmitted on the symbol #12. In this slot, the symbol #11 is used as an interval.

The second-type frequency hopping pattern shown in FIG. 6 supports repeated transmission at a level of a single slot.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH before the hopping in the first-type frequency hopping pattern are different, and the first-type time domain symbol occupied by the PUCCH before the hopping in the second-type frequency hopping pattern and the first-type time domain symbol occupied by the PUCCH before the hopping in the first-type frequency hopping pattern are different.

In a slot, the first-type time domain symbol occupied by the PUCCH after the hopping in the second-type frequency hopping pattern and the first-type time domain symbol occupied by the PUCCH before the hopping in the first-type frequency hopping pattern are the same, and the first-type time domain symbol occupied by the PUCCH after the hopping in the second-type frequency hopping pattern and the first-type time domain symbol occupied by the PUCCH after the hopping in the first-type frequency hopping pattern are the same.

Figure 7:
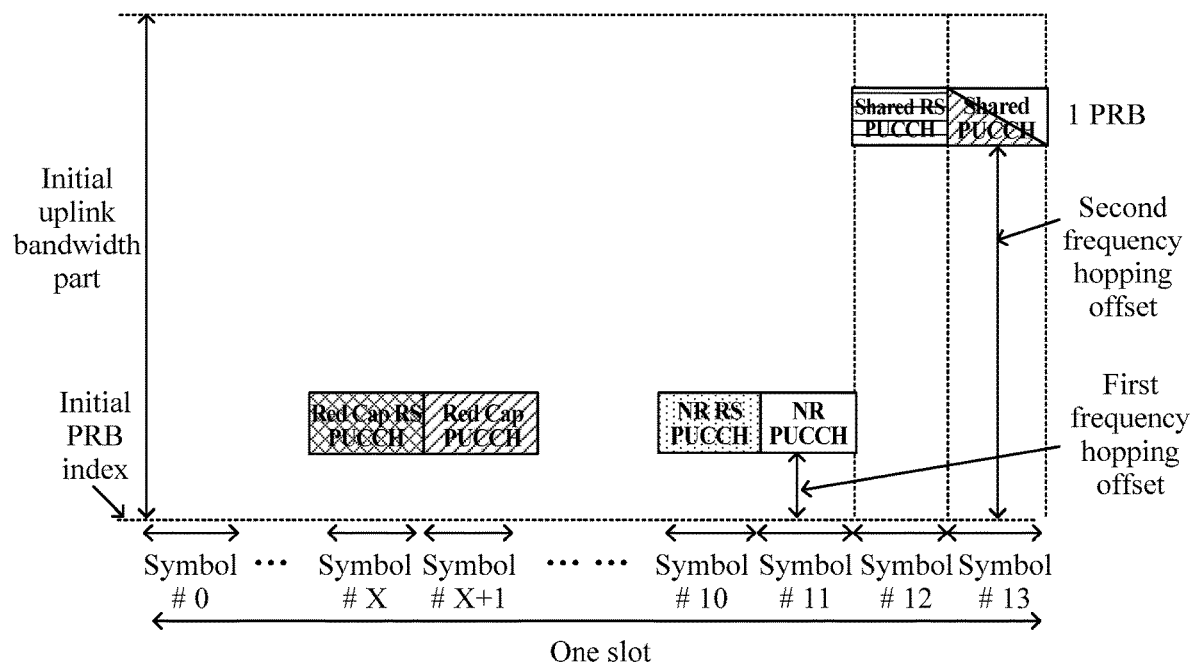
FIG. 7 is another schematic diagram of a second-type frequency hopping pattern in which a PUCCH format is format 1 and a PUCCH occupies four symbols according to an embodiment.

FIG. 7 is another schematic diagram of a second-type frequency hopping pattern in which a PUCCH format is format 1 and a PUCCH occupies four symbols according to an embodiment. As shown in FIG. 7, one slot includes fourteen OFDM symbols, and one block represents one PRB. A box where oblique lines are located represents the PUCCH used by the RedCap UE for carry the uplink control information, and a box where a grid region is located represents the PUCCH used by the RedCap UE for transmitting the RS; a box where horizontal lines are located represents the PUCCH shared by the RedCap UE and the NR UE for transmitting the RS, and a box where an unfilled region is located represents the PUCCH used by the NR UE for carrying the uplink control information. This case is applicable to PUCCH format 1.

For the second-type frequency hopping pattern, symbols #X and #X+1 in one slot are used as PUCCH symbols of the RedCap before the hopping, where the RS is transmitted on the symbol #X; the symbols #12 and #13 in this slot are used as the PUCCH symbols of the RedCap after the hopping, where the RS is transmitted on the symbol #12, and the PUCCH symbol of the RedCap after the hopping shares the symbols #12 and #13 with the PUCCH after the hopping in the first-type frequency hopping pattern. In addition, PUCCHs on the symbols #12 and #13 reuse the PUCCH for transmitting the RS after the hopping in the first-type frequency hopping pattern and the PUCCH for carrying the uplink control information, respectively. In this slot, symbols #X+4 to #11 are used as an interval.

The second-type frequency hopping pattern shown in FIG. 7 supports repeated transmission at a level of a single slot.

It is to be noted that the symbol #X may be selected according to an interval between PUCCHs of the RedCap UE before and after the hopping, and a quantization unit of the interval is a time domain length of an OFDM symbol, that is, the interval includes an integer number of OFDM symbols.

In an embodiment, the PUCCH satisfies at least one of the following (as shown in FIGS. 5 to 7).

A PUCCH format is format 1.

The number of the time domain symbols occupied by the PUCCH equals to 4.

The number of the time domain symbols occupied by the PUCCH before the hopping equals to 2, and the number of the time domain symbols occupied by the PUCCH after the hopping equals to 2.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

A PRB occupied in a frequency domain by the PUCCH before the hopping in the second-type frequency hopping pattern and a PRB occupied in the frequency domain by the PUCCH before the hopping in the first-type frequency hopping pattern are different and configured either independently or through different parameters.

In a slot, the first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the first-type frequency hopping pattern and the second-type time domain symbol occupied by the PUCCH after the hopping in the second-type frequency hopping pattern are the same.

Figure 8:
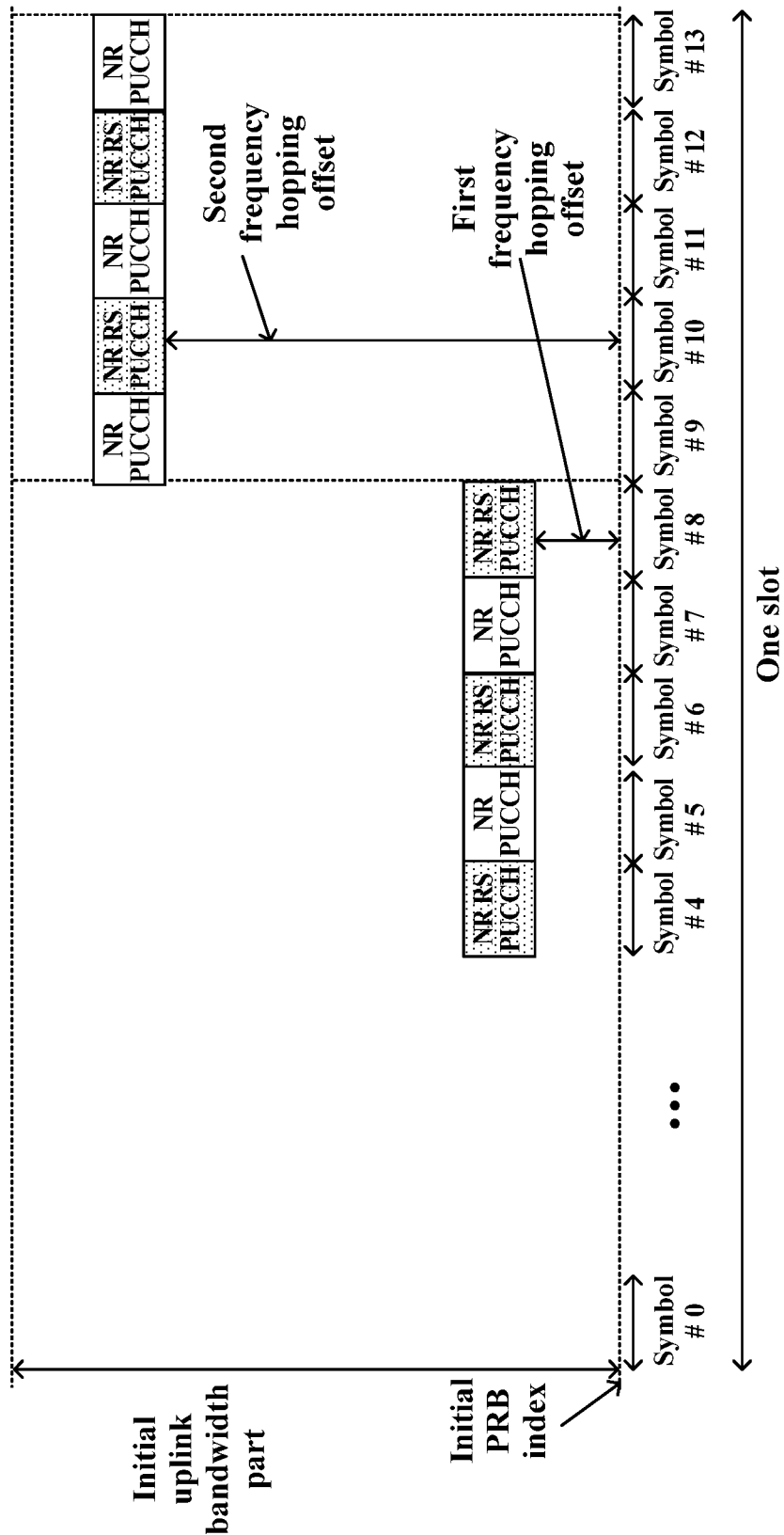
FIG. 8 is a schematic diagram of a first-type frequency hopping pattern in which a PUCCH format is format 1 and a PUCCH occupies ten symbols according to an embodiment.

FIG. 8 is a schematic diagram of a first-type frequency hopping pattern in which a PUCCH format is format 1 and a PUCCH occupies ten symbols according to an embodiment. As shown in FIG. 8, one slot includes fourteen OFDM symbols, and one block represents one PRB. A box where a dotted region is located represents the PUCCH used by the NR UE for transmitting the RS, and a box where an unfilled region is located represents the PUCCH used by the NR UE for carrying the uplink control information. This case is applicable to PUCCH format 1.

For the first-type frequency hopping pattern, symbols #4 to #8 in one slot are used as PUCCH symbols before the hopping, where the RS is transmitted on symbols #4, #6, and #8; symbols #9 to #13 in this slot are used as PUCCH symbols after the hopping, where the RS is transmitted on the symbol #10 and symbol #12.

Figure 9:
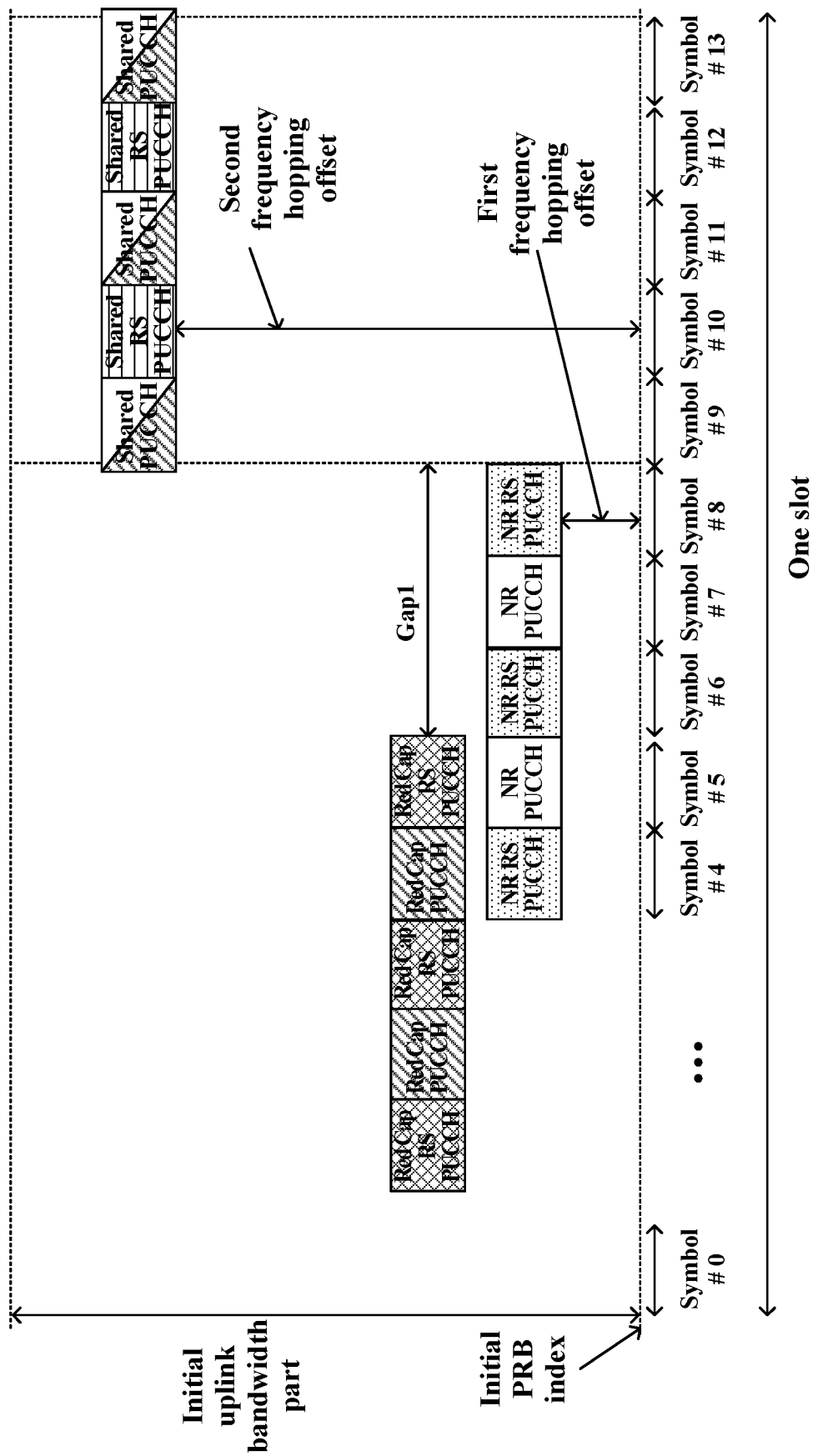
FIG. 9 is a schematic diagram of a second-type frequency hopping pattern in which a PUCCH format is format 1 and a PUCCH occupies ten symbols according to an embodiment.

FIG. 9 is a schematic diagram of a second-type frequency hopping pattern in which a PUCCH format is format 1 and a PUCCH occupies ten symbols according to an embodiment. As shown in FIG. 9, one slot includes fourteen OFDM symbols, and one block represents one PRB. A box where a dotted region is located represents the PUCCH used by the NR UE for transmitting the RS. A box where a grid region is located represents the PUCCH used by the RedCap UE for transmitting the RS. A box where horizontal lines are located represents the PUCCH shared by the RedCap UE and the NR UE for transmitting the RS. A box where oblique lines are located represents the PUCCH used by the RedCap UE for carrying the uplink control information, and a box where an unfilled region is located represents the PUCCH used by the NR UE for carrying the uplink control information. This case is applicable to PUCCH format 1.

For the second-type frequency hopping pattern, symbols #X, #X+1, #X+2, #X+3, and #X+4 in one slot are used as the PUCCH symbol of the RedCap before the hopping, where the RS is transmitted on symbols #X, #X+2, and #X+4. An interval between the symbol #X+4 and OFDM symbol #9 is Gap1, where Gap1 may be determined according to an interval between the PUCCHs of the RedCap UE before and after the hopping, and a quantization unit of Gap1 is a time domain length of an OFDM symbol. The PUCCH of the RedCap after the hopping shares symbols #9 to #13 with the PUCCH of the NR UE after the hopping in the first-type frequency hopping pattern, where the RS is transmitted on symbols #10 and #12.

In addition, the symbols occupied by the PUCCH of the RedCap UE before the hopping and the symbols occupied by the PUCCH of the NR UE before the hopping correspond to different PRBs in the frequency domain and the PRBs are configured either independently or through different parameters.

The second-type frequency hopping pattern shown in FIG. 9 supports repeated transmission at a level of a single slot.

In an embodiment, the PUCCH satisfies at least one of the following.

A PUCCH format is format 1 (as shown in FIGS. 5 to 11).

The number of the time domain symbols occupied by the PUCCH equals to 10 (as shown in FIGS. 8 and 9).

The number of the time domain symbols occupied by the PUCCH before the hopping equals to 5, and the number of the time domain symbols occupied by the PUCCH after the hopping equals to 5 (as shown in FIGS. 8 and 9).

According to the method of claim 1, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

A PRB occupied in a frequency domain by the PUCCH before the hopping in the second-type frequency hopping pattern and a PRB occupied in the frequency domain by the PUCCH before the hopping in the first-type frequency hopping pattern are different and configured either independently or through different parameters.

In a slot, the first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

Figure 10:
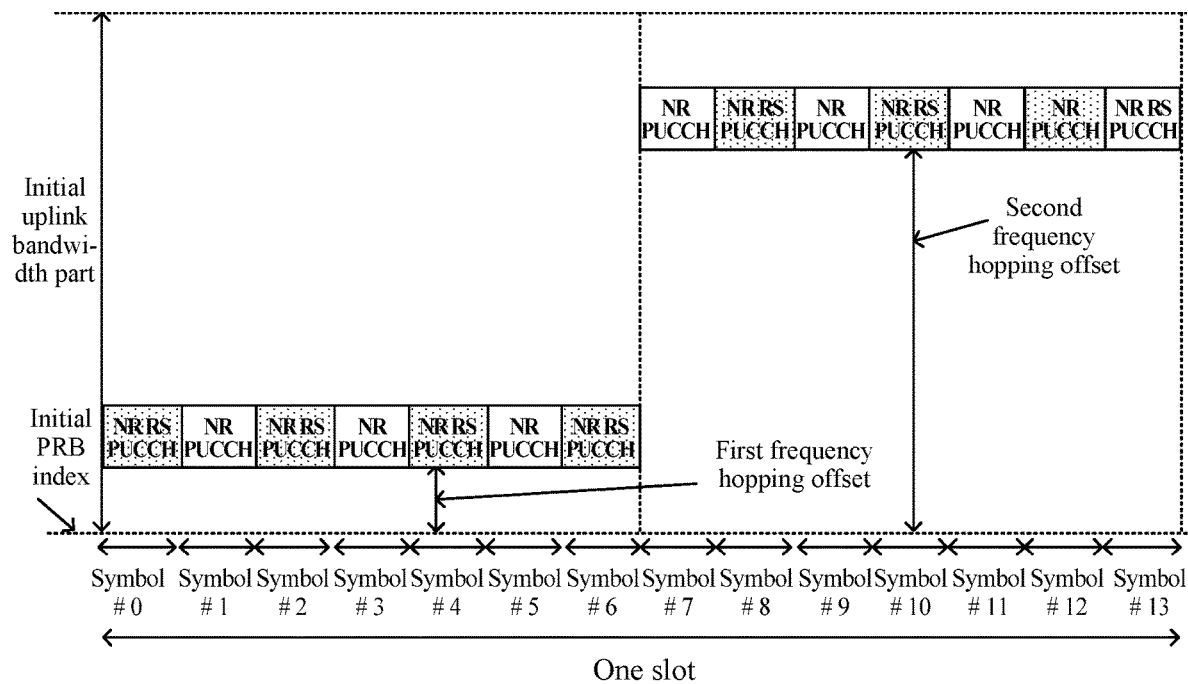
FIG. 10 is a schematic diagram of a first-type frequency hopping pattern in which a PUCCH format is format 1 and a PUCCH occupies ten symbols according to an embodiment.

FIG. 10 is a schematic diagram of a first-type frequency hopping pattern in which a PUCCH format is format 1 and a PUCCH occupies ten symbols according to an embodiment. As shown in FIG. 10, one slot includes fourteen OFDM symbols, and one block represents one PRB. A box where a dotted region is located represents the PUCCH used by the NR UE for transmitting the RS, and a box where an unfilled region is located represents the PUCCH used by the NR UE for carrying the uplink control information. This case is applicable to PUCCH format 1.

For the first-type frequency hopping pattern, symbols #0 to #6 in one slot are used as PUCCH symbols before the hopping, where the RS is transmitted on symbols #0, #2, #4, and #6; symbols #7 to #13 in this slot are used as PUCCH symbols after the hopping, where the RS is transmitted on symbols #8, #10, and #12.

Figure 11:
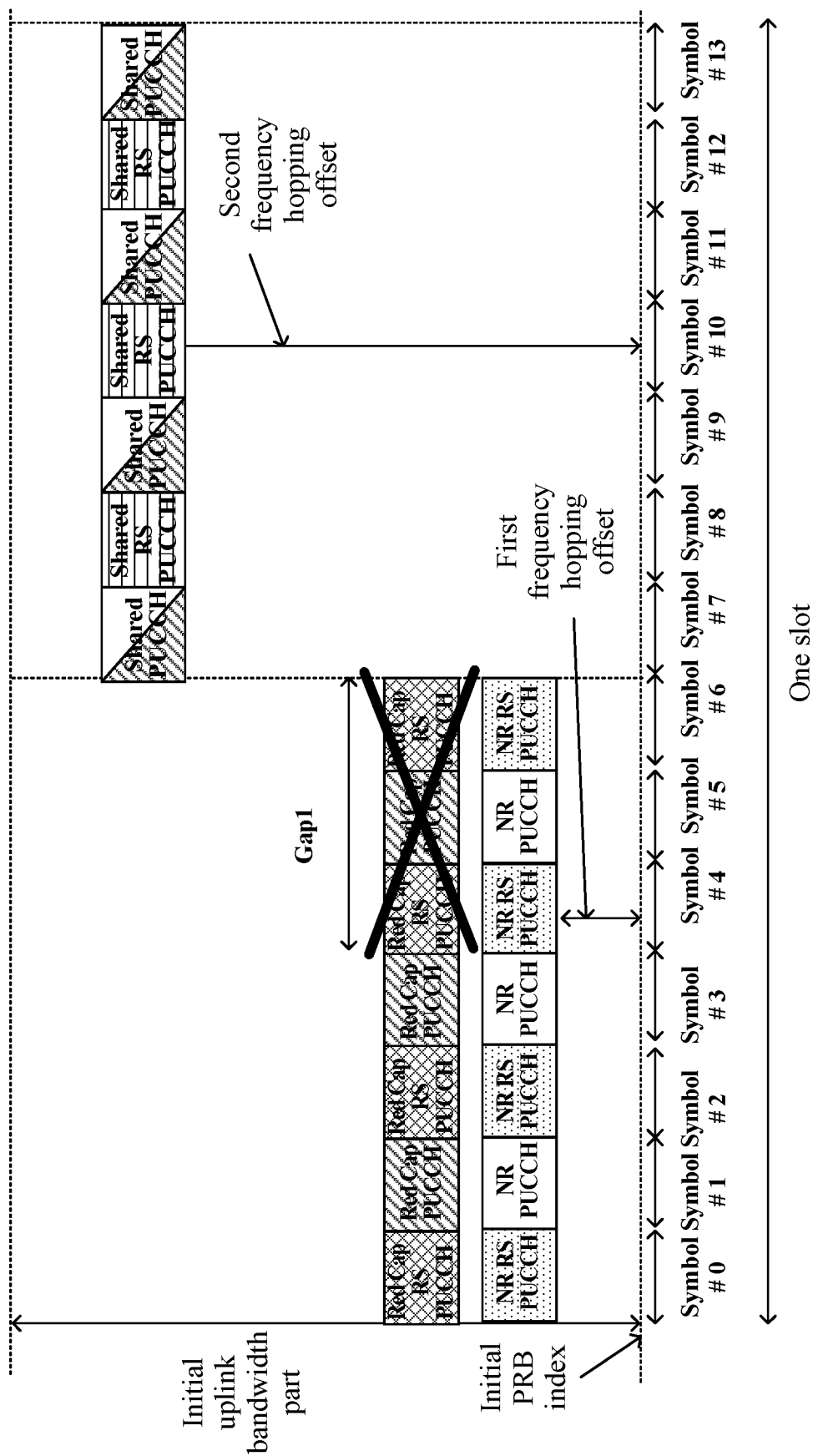
FIG. 11 is a schematic diagram of a second-type frequency hopping pattern in which a PUCCH format is format 1 and a PUCCH occupies eleven symbols according to an embodiment.

FIG. 11 is a schematic diagram of a second-type frequency hopping pattern in which a PUCCH format is format 1 and a PUCCH occupies eleven symbols according to an embodiment. As shown in FIG. 11, one slot includes fourteen OFDM symbols, and one block represents one PRB. A box where a dotted region is located represents the PUCCH used by the NR UE for transmitting the RS. A box where a grid region is located represents the PUCCH used by the RedCap UE for transmitting the RSA box where horizontal lines are located represents the PUCCH shared by the RedCap UE and the NR UE for transmitting the RS; a box where oblique lines are located represents the PUCCH used by the RedCap UE for carrying the uplink control information, and a box where an unfilled region is located represents the PUCCH used by the NR UE for carrying the uplink control information. This case is applicable to PUCCH format 1.

For the second-type frequency hopping pattern, symbols #1 to #X in one slot are used as the PUCCH symbol of the RedCap before the hopping, where the RS is transmitted on symbols #1, #3, and so on. An interval between the symbol #X and OFDM symbol #7 is Gap1, where Gap1 may be determined according to an interval between the PUCCHs of the RedCap UE before and after the hopping, and a quantization unit of Gap1 is a time domain length of an OFDM symbol.

The PUCCH of the RedCap after the hopping shares symbols #7 to #13 with the PUCCH of the NR UE after the hopping in the first-type frequency hopping pattern, where the RS is transmitted on symbols #8, #10, and #12.

In addition, the symbols occupied by the PUCCH of the RedCap UE before the hopping and the symbols occupied by the PUCCH of the NR UE before the hopping correspond to different PRBs in the frequency domain and the PRBs are configured either independently or through different parameters.

The second-type frequency hopping pattern shown in FIG. 11 supports repeated transmission at a level of a single slot.

In an embodiment, the time domain symbols occupied by the PUCCH further include a third-type time domain symbol used as the interval.

In the second-type frequency hopping pattern, the third-type time domain symbol is located on one or more symbols at an end of the PUCCH before the hopping; or the third-type time domain symbol is located on one or more symbols at a start of the PUCCH after the hopping.

In this embodiment, the third-type time domain symbol may be used by the RedCap UE for radio frequency adjustment so as to adapt to the PUCCH after the hopping. The third-type time domain symbols may be symbols at the end of the PUCCH before the hopping or may be symbols at the start of the PUCCH after the hopping.

In an embodiment, the PUCCH satisfies at least one of the following.

A PUCCH format is format 1 (as shown in FIGS. 5 to 11).

The number of the time domain symbols occupied by the PUCCH equals to 1 equals to 14 (as shown in FIGS. 10 and 11).

The number of the time domain symbols occupied by the PUCCH before the hopping equals to 7, and the number of the time domain symbols occupied by the PUCCH after the hopping equals to 7 (as shown in FIGS. 10 and 11).

Figure 12:
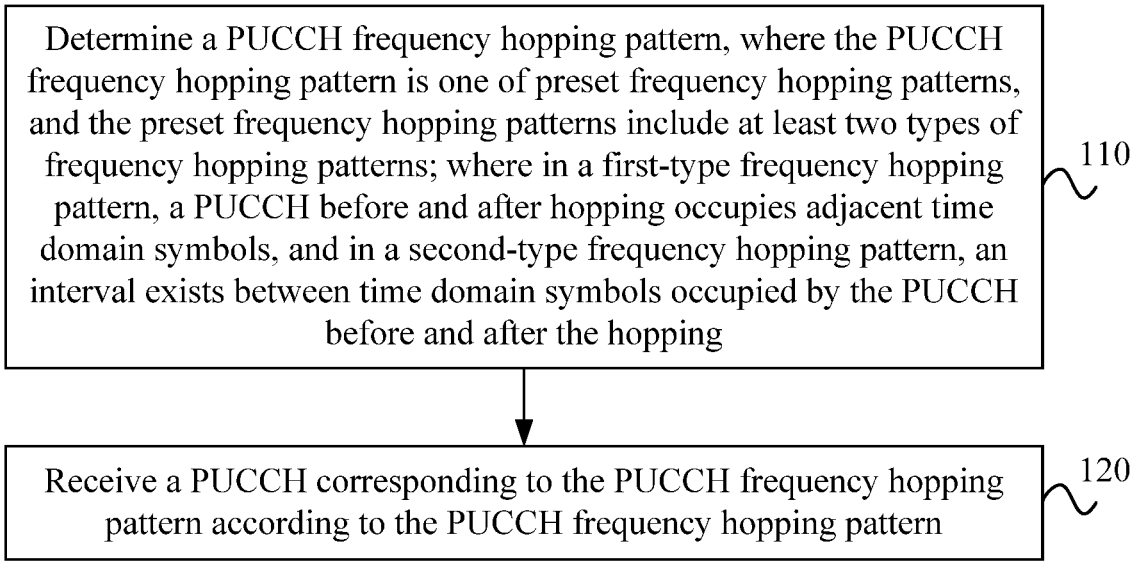
FIG. 12 is a flowchart of a channel reception method according to an embodiment.

An embodiment of the present application provides a channel reception method. The method is applicable to a receiver of a PUCCH, for example, a network side. FIG. 12 is a flowchart of a channel reception method according to an embodiment. As shown in FIG. 12, the method provided in this embodiment includes steps 210 and 220.

In step 210, a PUCCH frequency hopping pattern is determined, where the PUCCH frequency hopping pattern is one of preset frequency hopping patterns, and the preset frequency hopping patterns include at least two types of frequency hopping patterns. Where in a first-type frequency hopping pattern, a PUCCH before and after hopping occupies adjacent time domain symbols, and in a second-type frequency hopping pattern, an interval exists between time domain symbols occupied by the PUCCH before and after the hopping.

In step 220, a PUCCH corresponding to the PUCCH frequency hopping pattern is received according to the PUCCH frequency hopping pattern.

In the channel reception method provided in the embodiments of the present application, a PUCCH frequency hopping pattern is determined from at least two types of frequency hopping patterns for PUCCH reception, where in the first-type frequency hopping pattern, no interval for the UE with a relatively strong capacity to quickly complete the hopping and transmission of the PUCCH exists between PUCCHs before and after the hopping. In the second-type frequency hopping pattern, an interval exists between PUCCHs before and after the hopping, where the interval is used for the UE with a relatively weak capacity to perform radio frequency adjustment so as to support a PUCCH resource location after the hopping. In this manner, the at least two types of frequency hopping patterns are configured so as to ensure reception of the PUCCHs transmitted by UEs with different capacities and the reliability of a CBRA process.

In an embodiment, the step 210 includes the following.

First signaling indicates the second-type frequency hopping pattern as the PUCCH frequency hopping pattern.

Alternatively, in the case where a set condition is satisfied, the second-type frequency hopping pattern in the preset frequency hopping patterns is used as the PUCCH frequency hopping pattern.

The set condition includes at least one of the following.

A bandwidth of an initial uplink bandwidth part exceeds a maximum operating bandwidth supported by a terminal.

The bandwidth of the initial uplink bandwidth part exceeds a value configured at a network side.

The bandwidth of the initial uplink bandwidth part exceeds a default value.

In an embodiment, step 210 includes at least one of the following.

The PUCCH frequency hopping pattern is determined according to a PUCCH format and a number of the time domain symbols occupied by the PUCCH.

The PUCCH frequency hopping pattern is determined according to the PUCCH format, a number of the time domain symbols occupied by the PUCCH before the hopping, and a number of the time domain symbols occupied by the PUCCH after the hopping.

The PUCCH frequency hopping pattern is determined according to the PUCCH format, the number of the time domain symbols occupied by the PUCCH, the number of the time domain symbols occupied by the PUCCH before the hopping, and the number of the time domain symbols occupied by the PUCCH after the hopping.

The PUCCH frequency hopping pattern is determined according to the PUCCH format.

The PUCCH frequency hopping pattern is determined according to the number of the time domain symbols occupied by the PUCCH.

Second signaling indicates the PUCCH frequency hopping pattern.

In an embodiment, the time domain symbols occupied by the PUCCH before and/or after the hopping in the second-type frequency hopping pattern are determined according to the interval.

In an embodiment, a time domain length of the interval is an integer multiple of a time domain symbol, or an integer multiple of a time domain sampling interval, or an integer multiple of a time domain measurement unit.

In an embodiment, the second-type frequency hopping pattern satisfies the following.

The second-type frequency hopping pattern and the first-type frequency hopping pattern are in one slot.

The time domain symbols occupied by the PUCCH before the hopping in the second-type frequency hopping pattern and the time domain symbols occupied by the PUCCH before the hopping in the first-type frequency hopping pattern are different.

The time domain symbols occupied by the PUCCH after the hopping in the second-type frequency hopping pattern and the time domain symbols occupied by the PUCCH after the hopping in the first-type frequency hopping pattern are the same.

In an embodiment, the second-type frequency hopping pattern satisfies the following.

The time domain symbols occupied by the PUCCH before the hopping in the second-type frequency hopping pattern and the time domain symbols occupied by the PUCCH before the hopping in the first-type frequency hopping pattern are the same and located in a same slot.

The time domain symbols occupied by the PUCCH after the hopping in the second-type frequency hopping pattern and the time domain symbols occupied by the PUCCH after the hopping in the first-type frequency hopping pattern are located in different slots.

In an embodiment, the second-type frequency hopping pattern satisfies the following.

Indexes of the time domain symbols occupied by the PUCCH before the hopping in the second-type frequency hopping pattern and indexes of the time domain symbols occupied by the PUCCH before or after the hopping in the first-type frequency hopping pattern are the same and located in a same slot.

Indexes of the time domain symbols occupied by the PUCCH after the hopping in the second-type frequency hopping pattern and the indexes of the time domain symbols occupied by the PUCCH before or after the hopping in the first-type frequency hopping pattern are the same and located in different slots.

In an embodiment, in the second-type frequency hopping pattern, the time domain symbols occupied by the PUCCH after the hopping are located in a next slot of a slot where the time domain symbols occupied by the PUCCH before the hopping are located.

In an embodiment, the PUCCH frequency hopping pattern is the second-type frequency hopping pattern.

Transmitting the PUCCH corresponding to the PUCCH frequency hopping pattern according to the PUCCH frequency hopping pattern includes the following.

In the case where the PUCCH supports repeated transmission, one repeated transmission occupies one slot, and the PUCCH corresponding to the PUCCH frequency hopping pattern is transmitted according to the second-type frequency hopping pattern.

Alternatively, in the case where the PUCCH supports the repeated transmission, one repeated transmission occupies two slots, and the PUCCH corresponding to the PUCCH frequency hopping pattern is transmitted according to the second-type frequency hopping pattern.

In an embodiment, the PUCCH satisfies at least one of the following.

A PUCCH format is format 0.

The number of the time domain symbols occupied by the PUCCH equals to 2.

The number of the time domain symbols occupied by the PUCCH before the hopping equals to 1, and the number of the time domain symbols occupied by the PUCCH after the hopping equals to 1.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH before the hopping in the first-type frequency hopping pattern are the same, and the second-type time domain symbol occupied by the PUCCH before the hopping in the second-type frequency hopping pattern and the second-type time domain symbol occupied by the PUCCH before the hopping in the first-type frequency hopping pattern are different.

The first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH before the hopping in the first-type frequency hopping pattern are different, and the first-type time domain symbol occupied by the PUCCH before the hopping in the second-type frequency hopping pattern and the first-type time domain symbol occupied by the PUCCH before the hopping in the first-type frequency hopping pattern are different.

In a slot, the first-type time domain symbol occupied by the PUCCH after the hopping in the second-type frequency hopping pattern and the first-type time domain symbol occupied by the PUCCH before the hopping in the first-type frequency hopping pattern are the same, and the first-type time domain symbol occupied by the PUCCH after the hopping in the second-type frequency hopping pattern and the first-type time domain symbol occupied by the PUCCH after the hopping in the first-type frequency hopping pattern are the same.

In an embodiment, the PUCCH satisfies at least one of the following.

A PUCCH format is format 1.

The number of the time domain symbols occupied by the PUCCH equals to 4.

The number of the time domain symbols occupied by the PUCCH before the hopping equals to 2, and the number of the time domain symbols occupied by the PUCCH after the hopping equals to 2.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

A PRB occupied in a frequency domain by the PUCCH before the hopping in the second-type frequency hopping pattern and a PRB occupied in the frequency domain by the PUCCH before the hopping in the first-type frequency hopping pattern are different and configured either independently or through different parameters.

In a slot, the first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the first-type frequency hopping pattern and the second-type time domain symbol occupied by the PUCCH after the hopping in the second-type frequency hopping pattern are the same.

In an embodiment, the PUCCH satisfies at least one of the following.

A PUCCH format is format 1.

The number of the time domain symbols occupied by the PUCCH equals to 10.

The number of the time domain symbols occupied by the PUCCH before the hopping equals to 5, and the number of the time domain symbols occupied by the PUCCH after the hopping equals to 5.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

A PRB occupied in a frequency domain by the PUCCH before the hopping in the second-type frequency hopping pattern and a PRB occupied in the frequency domain by the PUCCH before the hopping in the first-type frequency hopping pattern are different and configured either independently or through different parameters.

In a slot, the first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

In an embodiment, the time domain symbols occupied by the PUCCH further include a third-type time domain symbol used as the interval.

In the second-type frequency hopping pattern, the third-type time domain symbol is located on one or more symbols at an end of the PUCCH before the hopping.

Alternatively, the third-type time domain symbol is located on one or more symbols at a start of the PUCCH after the hopping.

In an embodiment, the PUCCH satisfies at least one of the following.

A PUCCH format is format 1.

The number of the time domain symbols occupied by the PUCCH equals to 1 equals to 14.

The number of the time domain symbols occupied by the PUCCH before the hopping equals to 7, and the number of the time domain symbols occupied by the PUCCH after the hopping equals to 7.

Figure 13:
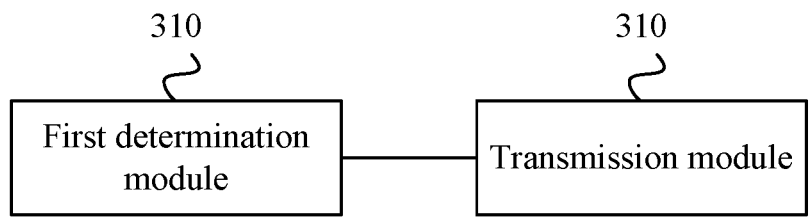
FIG. 13 is a structural diagram of a channel transmission apparatus according to an embodiment.

An embodiment of the present application further provides a channel transmission apparatus. FIG. 13 is a structural diagram of a channel transmission apparatus according to an embodiment. As shown in FIG. 13, the channel transmission apparatus includes a first determination module 310 and a transmission module 320.

The first determination module 310 is configured to determine a physical uplink control channel (PUCCH) frequency hopping pattern, where the PUCCH frequency hopping pattern is one of preset frequency hopping patterns, and the preset frequency hopping patterns include at least two types of frequency hopping patterns. Where in a first-type frequency hopping pattern, a PUCCH before and after hopping occupies adjacent time domain symbols, and in a second-type frequency hopping pattern, an interval exists between time domain symbols occupied by the PUCCH before and after the hopping.

The transmission module 320 is configured to transmit a PUCCH corresponding to the PUCCH frequency hopping pattern according to the PUCCH frequency hopping pattern.

In the channel transmission apparatus provided in the embodiments of the present application, a PUCCH frequency hopping pattern is determined from at least two types of frequency hopping patterns for PUCCH transmission, where in the first-type frequency hopping pattern, no interval for the UE with a relatively strong capacity to quickly complete the hopping and transmission of the PUCCH exists between PUCCHs before and after the hopping. In the second-type frequency hopping pattern, an interval exists between PUCCHs before and after the hopping, where the interval is used for the UE with a relatively weak capacity to perform radio frequency adjustment so as to support a PUCCH resource location after the hopping. In this manner, the at least two types of frequency hopping patterns are configured so as to ensure the PUCCH transmission by UEs with different capacities and the reliability of a CBRA process.

In an embodiment, the first determination module 310 is configured to perform the following.

The second-type frequency hopping pattern is used as the PUCCH frequency hopping pattern according to first signaling at a network side.

Alternatively, in the case where a set condition is satisfied, the second-type frequency hopping pattern in the preset frequency hopping patterns is used as the PUCCH frequency hopping pattern.

The set condition includes at least one of the following.

A bandwidth of an initial uplink bandwidth part exceeds a maximum operating bandwidth supported by a terminal.

The bandwidth of the initial uplink bandwidth part exceeds a value configured at the network side.

The bandwidth of the initial uplink bandwidth part exceeds a default value.

In an embodiment, the first determination module 310 is configured to perform at least one of the following.

The PUCCH frequency hopping pattern is determined according to a PUCCH format and a number of the time domain symbols occupied by the PUCCH.

The PUCCH frequency hopping pattern is determined according to the PUCCH format, a number of the time domain symbols occupied by the PUCCH before the hopping, and a number of the time domain symbols occupied by the PUCCH after the hopping.

The PUCCH frequency hopping pattern is determined according to the PUCCH format, the number of the time domain symbols occupied by the PUCCH, the number of the time domain symbols occupied by the PUCCH before the hopping, and the number of the time domain symbols occupied by the PUCCH after the hopping.

The PUCCH frequency hopping pattern is determined according to the PUCCH format.

The PUCCH frequency hopping pattern is determined according to the number of the time domain symbols occupied by the PUCCH.

The PUCCH frequency hopping pattern is determined according to second signaling at a network side.

In an embodiment, the time domain symbols occupied by the PUCCH before and/or after the hopping in the second-type frequency hopping pattern are determined according to the interval.

In an embodiment, a time domain length of the interval is an integer multiple of a time domain symbol, or an integer multiple of a time domain sampling interval, or an integer multiple of a time domain measurement unit.

In an embodiment, the second-type frequency hopping pattern satisfies the following.

The second-type frequency hopping pattern and the first-type frequency hopping pattern are in one slot.

The time domain symbols occupied by the PUCCH before the hopping in the second-type frequency hopping pattern and the time domain symbols occupied by the PUCCH before the hopping in the first-type frequency hopping pattern are different.

The time domain symbols occupied by the PUCCH after the hopping in the second-type frequency hopping pattern and the time domain symbols occupied by the PUCCH after the hopping in the first-type frequency hopping pattern are the same.

In an embodiment, the second-type frequency hopping pattern satisfies the following.

The time domain symbols occupied by the PUCCH before the hopping in the second-type frequency hopping pattern and the time domain symbols occupied by the PUCCH before the hopping in the first-type frequency hopping pattern are the same and located in a same slot.

The time domain symbols occupied by the PUCCH after the hopping in the second-type frequency hopping pattern and the time domain symbols occupied by the PUCCH after the hopping in the first-type frequency hopping pattern are located in different slots.

In an embodiment, the second-type frequency hopping pattern satisfies the following.

Indexes of the time domain symbols occupied by the PUCCH before the hopping in the second-type frequency hopping pattern and indexes of the time domain symbols occupied by the PUCCH before or after the hopping in the first-type frequency hopping pattern are the same and located in a same slot.

Indexes of the time domain symbols occupied by the PUCCH after the hopping in the second-type frequency hopping pattern and the indexes of the time domain symbols occupied by the PUCCH before or after the hopping in the first-type frequency hopping pattern are the same and located in different slots.

In an embodiment, in the second-type frequency hopping pattern, the time domain symbols occupied by the PUCCH after the hopping are located in a next slot of a slot where the time domain symbols occupied by the PUCCH before the hopping are located.

In an embodiment, the PUCCH frequency hopping pattern is the second-type frequency hopping pattern.

Transmitting the PUCCH corresponding to the PUCCH frequency hopping pattern according to the PUCCH frequency hopping pattern includes the following.

In the case where the PUCCH supports repeated transmission, one repeated transmission occupies one slot, and the PUCCH corresponding to the PUCCH frequency hopping pattern is transmitted according to the second-type frequency hopping pattern.

Alternatively, in the case where the PUCCH supports the repeated transmission, one repeated transmission occupies two slots, and the PUCCH corresponding to the PUCCH frequency hopping pattern is transmitted according to the second-type frequency hopping pattern.

In an embodiment, the PUCCH satisfies at least one of the following.

A PUCCH format is format 0.

The number of the time domain symbols occupied by the PUCCH equals to 2.

The number of the time domain symbols occupied by the PUCCH before the hopping equals to 1, and the number of the time domain symbols occupied by the PUCCH after the hopping equals to 1.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH before the hopping in the first-type frequency hopping pattern are the same, and the second-type time domain symbol occupied by the PUCCH before the hopping in the second-type frequency hopping pattern and the second-type time domain symbol occupied by the PUCCH before the hopping in the first-type frequency hopping pattern are different.

The first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH before the hopping in the first-type frequency hopping pattern are different, and the first-type time domain symbol occupied by the PUCCH before the hopping in the second-type frequency hopping pattern and the first-type time domain symbol occupied by the PUCCH before the hopping in the first-type frequency hopping pattern are different.

In a slot, the first-type time domain symbol occupied by the PUCCH after the hopping in the second-type frequency hopping pattern and the first-type time domain symbol occupied by the PUCCH before the hopping in the first-type frequency hopping pattern are the same, and the first-type time domain symbol occupied by the PUCCH after the hopping in the second-type frequency hopping pattern and the first-type time domain symbol occupied by the PUCCH after the hopping in the first-type frequency hopping pattern are the same.

In an embodiment, the PUCCH satisfies at least one of the following.

A PUCCH format is format 1.

The number of the time domain symbols occupied by the PUCCH equals to 4.

The number of the time domain symbols occupied by the PUCCH before the hopping equals to 2, and the number of the time domain symbols occupied by the PUCCH after the hopping equals to 2.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

A PRB occupied in a frequency domain by the PUCCH before the hopping in the second-type frequency hopping pattern and a PRB occupied in the frequency domain by the PUCCH before the hopping in the first-type frequency hopping pattern are different and configured either independently or through different parameters.

In a slot, the first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the first-type frequency hopping pattern and the second-type time domain symbol occupied by the PUCCH after the hopping in the second-type frequency hopping pattern are the same.

In an embodiment, the PUCCH satisfies at least one of the following.

A PUCCH format is format 1.

The number of the time domain symbols occupied by the PUCCH equals to 10.

The number of the time domain symbols occupied by the PUCCH before the hopping equals to 5, and the number of the time domain symbols occupied by the PUCCH after the hopping equals to 5.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

A PRB occupied in a frequency domain by the PUCCH before the hopping in the second-type frequency hopping pattern and a PRB occupied in the frequency domain by the PUCCH before the hopping in the first-type frequency hopping pattern are different and configured either independently or through different parameters.

In a slot, the first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

In an embodiment, the time domain symbols occupied by the PUCCH further include a third-type time domain symbol used as the interval.

In the second-type frequency hopping pattern, the third-type time domain symbol is located on one or more symbols at an end of the PUCCH before the hopping.

Alternatively, the third-type time domain symbol is located on one or more symbols at a start of the PUCCH after the hopping.

In an embodiment, the PUCCH satisfies at least one of the following.

A PUCCH format is format 1.

The number of the time domain symbols occupied by the PUCCH equals to 14.

The number of the time domain symbols occupied by the PUCCH before the hopping equals to 7, and the number of the time domain symbols occupied by the PUCCH after the hopping equals to 7.

The channel transmission apparatus provided in this embodiment and the channel transmission method provided in the preceding embodiments belong to the same concept. For technical details not described in detail in this embodiment, reference may be made to any one of the preceding embodiments.

Figure 14:
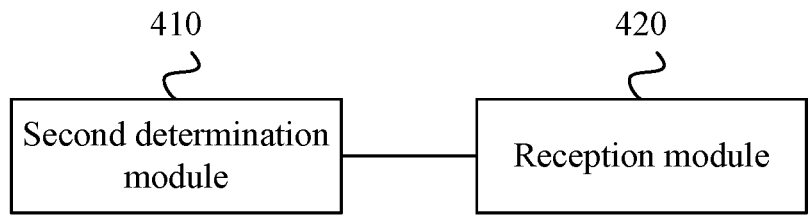
FIG. 14 is a structural diagram of a channel reception apparatus according to an embodiment.

An embodiment of the present application further provides a channel reception apparatus. FIG. 14 is a structural diagram of a channel reception apparatus according to an embodiment. As shown in FIG. 14, the channel reception apparatus includes a second determination module 410 and a reception module 420.

The second determination module 410 is configured to determine a physical uplink control channel (PUCCH) frequency hopping pattern, where the PUCCH frequency hopping pattern is one of preset frequency hopping patterns, and the preset frequency hopping patterns include at least two types of frequency hopping patterns; where in a first-type frequency hopping pattern, a PUCCH before and after hopping occupies adjacent time domain symbols, and in a second-type frequency hopping pattern, an interval exists between time domain symbols occupied by the PUCCH before and after the hopping.

The reception module 420 is configured to receive a PUCCH corresponding to the PUCCH frequency hopping pattern according to the PUCCH frequency hopping pattern.

In the channel reception apparatus provided in the embodiments of the present application, a PUCCH frequency hopping pattern is determined from at least two types of frequency hopping patterns for PUCCH reception, where in the first-type frequency hopping pattern, no interval for the UE with a relatively strong capacity to quickly complete the hopping and transmission of the PUCCH exists between PUCCHs before and after the hopping; in the second-type frequency hopping pattern, an interval exists between PUCCHs before and after the hopping, where the interval is used for the UE with a relatively weak capacity to perform radio frequency adjustment so as to support a PUCCH resource location after the hopping. In this manner, the at least two types of frequency hopping patterns are configured so as to ensure reception of the PUCCHs transmitted by UEs with different capacities and the reliability of a CBRA process.

In an embodiment, the second determination module 410 is configured to perform the following.

First signaling indicates the second-type frequency hopping pattern as the PUCCH frequency hopping pattern.

Alternatively, in the case where a set condition is satisfied, the second-type frequency hopping pattern in the preset frequency hopping patterns is used as the PUCCH frequency hopping pattern.

The set condition includes at least one of the following.

A bandwidth of an initial uplink bandwidth part exceeds a maximum operating bandwidth supported by a terminal.

The bandwidth of the initial uplink bandwidth part exceeds a value configured at a network side.

The bandwidth of the initial uplink bandwidth part exceeds a default value.

In an embodiment, the second determination module 410 is configured to perform at least one of the following.

The PUCCH frequency hopping pattern is determined according to a PUCCH format and a number of the time domain symbols occupied by the PUCCH.

The PUCCH frequency hopping pattern is determined according to the PUCCH format, a number of the time domain symbols occupied by the PUCCH before the hopping, and a number of the time domain symbols occupied by the PUCCH after the hopping.

The PUCCH frequency hopping pattern is determined according to the PUCCH format, the number of the time domain symbols occupied by the PUCCH, the number of the time domain symbols occupied by the PUCCH before the hopping, and the number of the time domain symbols occupied by the PUCCH after the hopping.

The PUCCH frequency hopping pattern is determined according to the PUCCH format.

The PUCCH frequency hopping pattern is determined according to the number of the time domain symbols occupied by the PUCCH.

Second signaling indicates the PUCCH frequency hopping pattern.

In an embodiment, the time domain symbols occupied by the PUCCH before and/or after the hopping in the second-type frequency hopping pattern are determined according to the interval.

In an embodiment, a time domain length of the interval is an integer multiple of a time domain symbol, or an integer multiple of a time domain sampling interval, or an integer multiple of a time domain measurement unit.

In an embodiment, the second-type frequency hopping pattern satisfies the following.

The second-type frequency hopping pattern and the first-type frequency hopping pattern are in one slot.

The time domain symbols occupied by the PUCCH before the hopping in the second-type frequency hopping pattern and the time domain symbols occupied by the PUCCH before the hopping in the first-type frequency hopping pattern are different.

The time domain symbols occupied by the PUCCH after the hopping in the second-type frequency hopping pattern and the time domain symbols occupied by the PUCCH after the hopping in the first-type frequency hopping pattern are the same.

In an embodiment, the second-type frequency hopping pattern satisfies the following.

The time domain symbols occupied by the PUCCH before the hopping in the second-type frequency hopping pattern and the time domain symbols occupied by the PUCCH before the hopping in the first-type frequency hopping pattern are the same and located in a same slot.

The time domain symbols occupied by the PUCCH after the hopping in the second-type frequency hopping pattern and the time domain symbols occupied by the PUCCH after the hopping in the first-type frequency hopping pattern are located in different slots.

In an embodiment, the second-type frequency hopping pattern satisfies the following.

Indexes of the time domain symbols occupied by the PUCCH before the hopping in the second-type frequency hopping pattern and indexes of the time domain symbols occupied by the PUCCH before or after the hopping in the first-type frequency hopping pattern are the same and located in a same slot.

Indexes of the time domain symbols occupied by the PUCCH after the hopping in the second-type frequency hopping pattern and the indexes of the time domain symbols occupied by the PUCCH before or after the hopping in the first-type frequency hopping pattern are the same and located in different slots.

In an embodiment, in the second-type frequency hopping pattern, the time domain symbols occupied by the PUCCH after the hopping are located in a next slot of a slot where the time domain symbols occupied by the PUCCH before the hopping are located.

In an embodiment, the PUCCH frequency hopping pattern is the second-type frequency hopping pattern.

Transmitting the PUCCH corresponding to the PUCCH frequency hopping pattern according to the PUCCH frequency hopping pattern includes the following.

In the case where the PUCCH supports repeated transmission, one repeated transmission occupies one slot, and the PUCCH corresponding to the PUCCH frequency hopping pattern is transmitted according to the second-type frequency hopping pattern.

Alternatively, in the case where the PUCCH supports the repeated transmission, one repeated transmission occupies two slots, and the PUCCH corresponding to the PUCCH frequency hopping pattern is transmitted according to the second-type frequency hopping pattern.

In an embodiment, the PUCCH satisfies at least one of the following.

A PUCCH format is format 0.

The number of the time domain symbols occupied by the PUCCH equals to 2.

The number of the time domain symbols occupied by the PUCCH before the hopping equals to 1, and the number of the time domain symbols occupied by the PUCCH after the hopping equals to 1.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH before the hopping in the first-type frequency hopping pattern are the same, and the second-type time domain symbol occupied by the PUCCH before the hopping in the second-type frequency hopping pattern and the second-type time domain symbol occupied by the PUCCH before the hopping in the first-type frequency hopping pattern are different.

The first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH before the hopping in the first-type frequency hopping pattern are different, and the first-type time domain symbol occupied by the PUCCH before the hopping in the second-type frequency hopping pattern and the first-type time domain symbol occupied by the PUCCH before the hopping in the first-type frequency hopping pattern are different.

In a slot, the first-type time domain symbol occupied by the PUCCH after the hopping in the second-type frequency hopping pattern and the first-type time domain symbol occupied by the PUCCH before the hopping in the first-type frequency hopping pattern are the same, and the first-type time domain symbol occupied by the PUCCH after the hopping in the second-type frequency hopping pattern and the first-type time domain symbol occupied by the PUCCH after the hopping in the first-type frequency hopping pattern are the same.

In an embodiment, the PUCCH satisfies at least one of the following.

A PUCCH format is format 1.

The number of the time domain symbols occupied by the PUCCH equals to 4.

The number of the time domain symbols occupied by the PUCCH before the hopping equals to 2, and the number of the time domain symbols occupied by the PUCCH after the hopping equals to 2.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

A PRB occupied in a frequency domain by the PUCCH before the hopping in the second-type frequency hopping pattern and a PRB occupied in the frequency domain by the PUCCH before the hopping in the first-type frequency hopping pattern are different and configured either independently or through different parameters.

In a slot, the first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the first-type frequency hopping pattern and the second-type time domain symbol occupied by the PUCCH after the hopping in the second-type frequency hopping pattern are the same.

In an embodiment, the PUCCH satisfies at least one of the following.

A PUCCH format is format 1.

The number of the time domain symbols occupied by the PUCCH equals to 10.

The number of the time domain symbols occupied by the PUCCH before the hopping equals to 5, and the number of the time domain symbols occupied by the PUCCH after the hopping equals to 5.

In an embodiment, the time domain symbols occupied by the PUCCH include a first-type time domain symbol used for transmitting an RS and a second-type time domain symbol used for carrying uplink control information.

The second-type frequency hopping pattern satisfies the following.

In a slot, the first-type time domain symbol occupied by the PUCCH before the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

A PRB occupied in a frequency domain by the PUCCH before the hopping in the second-type frequency hopping pattern and a PRB occupied in the frequency domain by the PUCCH before the hopping in the first-type frequency hopping pattern are different and configured either independently or through different parameters.

In a slot, the first-type time domain symbol occupied by the PUCCH after the hopping in the second-type frequency hopping pattern and the first-type time domain symbol occupied by the PUCCH after the hopping in the first-type frequency hopping pattern are the same, and the second-type time domain symbol occupied by the PUCCH after the hopping in the second-type frequency hopping pattern and the second-type time domain symbol occupied by the PUCCH after the hopping in the first-type frequency hopping pattern are the same.

In an embodiment, the time domain symbols occupied by the PUCCH further include a third-type time domain symbol used as the interval.

In the second-type frequency hopping pattern, the third-type time domain symbol is located on one or more symbols at an end of the PUCCH before the hopping.

Alternatively, the third-type time domain symbol is located on one or more symbols at a start of the PUCCH after the hopping.

In an embodiment, the PUCCH satisfies at least one of the following.

A PUCCH format is format 1.

The number of the time domain symbols occupied by the PUCCH equals to 14.

The number of the time domain symbols occupied by the PUCCH before the hopping equals to 7, and the number of the time domain symbols occupied by the PUCCH after the hopping equals to 7.

The channel reception apparatus provided in this embodiment and the channel reception method provided in the preceding embodiments belong to the same concept. For technical details not described in detail in this embodiment, reference may be made to any one of the preceding embodiments.

In addition, in a current wireless communication standard, the UE may use discontinuous reception (DRX) in an idle mode so as to reduce power consumption. The DRX of the UE in the idle mode is mainly to monitor a paging channel and a broadcast channel. As long as a fixed cycle is defined, an object of the DRX may be achieved. A description of currently determining a DRX cycle of paging is as follows: if an upper layer configures a UE-specific extended DRX value of 512 radio frames, the DRX cycle of the UE is 512. Otherwise, the DRX cycle of the UE is determined by the shortest among the UE-specific DRX value (if assigned by the upper layer) and a default DRX value broadcast in system information. If no UE-specific DRX is configured by the upper layer, a default value applies. In a connection inactive RRC_INACTIVE state, if no extended DRX is configured by the upper layer, the DRX cycle of the UE is determined by the shortest among a radio access network (RAN) paging cycle, a UE-specific paging cycle (if assigned by the upper layer) and a default paging cycle. Otherwise, in the case where extended DRX is configured by the upper layer, in the connection inactive RRC_INACTIVE state, the DRX cycle of the UE in a period of paging time windows (PTW) is determined by the shortest among the RAN paging cycle, the UE-specific paging cycle (if assigned by the upper layer) and the default paging cycle and determined by the RAN paging cycle other than the PTW.

Since the UE needs to monitor core network (CN) paging in both the idle mode and in the connection inactive RRC_INACTIVE state, how to ensure the consistency of group wake-up signal (GWUS) resource selection, a paging subframe and a paging narrowband selected by the base station and the UE for the CN paging needs a further analysis.

Figure 15:
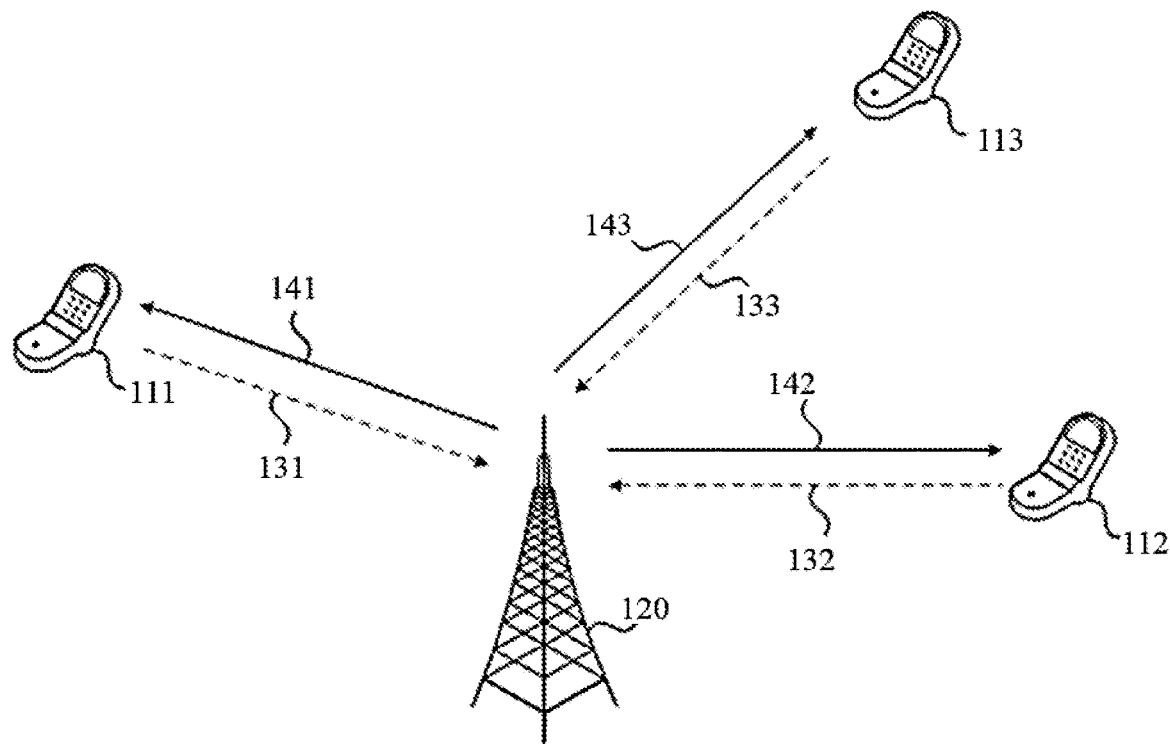
FIG. 15 is a schematic diagram of a wireless communication system according to an embodiment.

FIG. 15 is a schematic diagram of a wireless communication system according to an embodiment.

FIG. 15 shows an example of a wireless communication system (for example, Internet of Things technology based on Long-Term Evolution (LTE) eMTC, LTE, 5G or an NR cellular network) including a base station (BS) 120 and one or more user equipment (UE) 111, 112 and 113. In some embodiments, uplink transmissions 131, 132, and 133 may include uplink control information (UCI), higher layer signaling (for example, UE assistance information or UE capabilities) or uplink information. In some embodiments, downlink transmissions 141, 142, and 143 may include downlink control information (DCI) or higher layer signaling or downlink information. The UE may be, for example, a smartphone, a tablet computer, a mobile computer, a machine-to-machine (M2M) device, a terminal, a mobile device, an Internet of Things (IoT) device, and the like.

The parameter determination apparatus provided in this embodiment is applied to the parameter determination method in the embodiments of the present application. The parameter determination apparatus provided in this embodiment has implementation principles and technical effects similar to those of the parameter determination method in the embodiments of the present application, which is not repeated here.

In an exemplary embodiment, GWUS resource selection, a paging subframe and paging narrowband selection depend on the DRX cycle. Since the UE needs to monitor the CN paging in both the idle mode and the RRC_INACTIVE state, to ensure the consistency of the GWUS resource selection, the paging subframe, and the paging narrowband selected by the base station and the UE for the CN paging, methods in the following embodiments need to be adopted.

In an exemplary embodiment, for the UE in the RRC_INACTIVE state, in a scenario where the CN paging and RAN paging need to be monitored simultaneously, the DRX cycle is equal to a DRX cycle in the idle mode; otherwise, the DRX cycle is equal to the RAN paging cycle. A specific method for determining the DRX cycle in the RRC_INACTIVE state includes at least one of the following.

In the case where paging extended DRX is not configured by a core network non-access stratum (NAS), the DRX cycle is determined by the shortest cycle among the UE-specific paging cycle (if the upper layer is configured with the UE-specific paging cycle) and the default paging cycle.

In the case where the paging extended DRX (eDRX) is configured by the NAS, but the paging eDRX does not include the PTW, the DRX cycle is a paging eDRX cycle. For example, in eMTC, in the case where the paging extended DRX value of 512 radio frames is configured by NAS, the DRX cycle equals to 512 radio frames.

In the case where the paging extended DRX is configured by the NAS and the paging extended DRX includes the PTW, the DRX cycle within the PTW is determined by the shortest cycle among the UE-specific paging cycle (if the upper layer is configured with the UE-specific paging cycle) and the default paging cycle, while the DRX cycle outside the PTW is determined by the RAN paging cycle.

In an exemplary embodiment, for the UE in the RRC_INACTIVE state, in a scenario where the CN paging and RAN paging need to be monitored simultaneously, for the calculation of the paging radio frame, the DRX cycle is determined by the shortest cycle among the RAN paging cycle and the DRX cycle in the idle mode. For the calculation of the other radio resources such as the paging subframe, the paging narrowband, and the GWUS resource, the DRX cycle is determined by the DRX cycle in the idle mode. For the UE in the RRC_INACTIVE state, in a scenario where the RAN paging does not need to be monitored, the DRX cycle is determined by the RAN paging cycle. A specific method for determining the DRX cycle in the RRC_INACTIVE state includes at least one of the following.

For the calculation of paging radio frame, in the case where the paging extended DRX is not configured by NAS, the DRX cycle is determined by the shortest cycle among the RAN paging cycle, the UE-specific paging cycle (if assigned by the upper layer), and the default paging cycle. In the case where the paging extended DRX is configured by NAS, but does not include the PTW, the DRX cycle is determined by the shortest cycle among the RAN paging cycle and a paging extended DRX cycle. For example, in eMTC, if the paging extended DRX is configured by NAS and the paging extended DRX cycle does not include PTW, the paging DRX cycle is determined by the shortest cycle among the RAN paging cycle and a cycle of 512 radio frames. In the case where the paging extended DRX is configured by NAS and the paging extended DRX includes the PTW, the DRX cycle within the PTW is determined by the shortest cycle among the UE-specific paging cycle (if the upper layer is configured with the UE-specific paging cycle) and the default paging cycle, while the DRX cycle outside the PTW is determined by the RAN paging cycle.

For other paging resource calculations (such as paging subframe calculation, paging narrowband calculation, and GWUS resource selection), in the case where the paging extended DRX is not configured by NAS, the DRX cycle is determined by the shortest cycle among the UE-specific paging cycle (if the upper layer is configured with the UE-specific paging cycle) and the default paging cycle. In the case where the paging extended DRX is configured by NAS, but does not include the PTW, the DRX cycle is determined by the paging extended DRX cycle. For example, in eMTC, in the case where the paging extended DRX value of 512 radio frames is configured, the DRX cycle is 512 radio frames. In the case where the paging extended DRX is configured by NAS and includes the PTW, the DRX cycle within the PTW is determined by the shortest cycle among the UE-specific paging cycle (if the upper layer is configured with the UE-specific paging cycle) and the default paging cycle, while the DRX cycle outside the PTW is determined by the RAN paging cycle.

In an exemplary embodiment, the DRX cycle of the CN paging is determined by the shortest cycle among the UE-specific paging cycle (if the upper layer is configured with the UE-specific paging cycle) and the default paging cycle. The DRX cycle of the RAN paging is determined by the RAN paging cycle. In the case where the UE monitors the CN paging, paging resources are calculated by using the DRX cycle of the CN paging; in the case where the UE monitors the RAN paging, the paging resources are calculated by using the DRX cycle of the RAN paging; and in the case where the UE monitors the CN paging and the RAN paging at the same time, two types of resources are monitored at the same time.

In an exemplary embodiment, the UE monitors the CN paging in the RRC_INACTIVE state with the following policy: in the case where the paging extended DRX is not configured by NAS, the DRX cycle is determined by the shortest cycle among the RAN paging cycle, the UE-specific paging cycle (if assigned by the upper layer), and the default paging cycle. In the case where the paging extended DRX is configured by NAS, but does not include the PTW, the DRX cycle is determined by the shortest cycle among the RAN paging cycle and a paging extended DRX cycle length. For example, in eMTC, if paging extended DRX is configured by NAS and the paging extended DRX does not include the PTW, the paging extended DRX cycle is determined by the shortest cycle among the RAN paging cycle and a cycle of 512 radio frames. In the case where the paging extended DRX is configured by NAS and includes the PTW, the DRX cycle within the PTW is determined by the shortest cycle among the UE-specific paging cycle (if the upper layer is configured with the UE-specific paging cycle) and the default paging cycle, while the DRX cycle outside the PTW is determined by the RAN paging cycle. In an occasion of the UE monitoring the CN paging and the RAN paging at the same time, the base station sends paging at the same time in the following two manners.

In manner 1, in the case where the paging extended DRX is not configured by NAS, the DRX cycle is determined by the shortest cycle among the RAN paging cycle, the UE-specific paging cycle (if assigned by the upper layer), and the default paging cycle. In the case where the paging extended DRX is configured by NAS, but the paging extended DRX does not include the PTW, the DRX cycle is determined by the shortest cycle among the RAN paging cycle and the paging extended DRX cycle length. For example, in eMTC, if the paging extended DRX is configured by NAS and the paging extended DRX does not include PTW, the paging extended DRX cycle is determined by the shortest cycle among the RAN paging cycle and a cycle of 512 radio frames. In the case where the paging extended DRX is configured by NAS and includes the PTW, the DRX cycle within the PTW is determined by the shortest cycle among the RAN paging cycle, the UE-specific paging cycle (if assigned by the upper layer), and the default paging cycle. The DRX cycle outside the PTW is determined by the RAN paging cycle.

In manner 2, in the case where the paging extended DRX is not configured by NAS, the DRX cycle is determined by the shortest cycle among the UE-specific paging cycle (if the upper layer is configured with the UE-specific paging cycle) and the default paging cycle. In the case where the paging extended DRX is configured by NAS, but does not include the PTW, the DRX cycle is determined by the paging extended DRX cycle. For example, in eMTC, in the case where the paging extended DRX value of 512 radio frames is configured, the DRX cycle is 512 radio frames. In the case where the paging extended DRX is configured by NAS and includes the PTW, the DRX cycle within the PTW is determined by the shortest cycle among the UE-specific paging cycle (if assigned by the upper layer) and the default paging cycle. The DRX cycle outside the PTW is determined by the RAN paging cycle.

In an exemplary embodiment, the configuration ensures that the RAN paging cycle is greater than or equal to the shortest cycle among the UE-specific paging cycle (if the upper layer is configured with the UE-specific paging cycle) and the default paging cycle.

In an exemplary embodiment, the configuration ensures that the base station does not configure the number of paging occasions in one cycle to be 4T or 2T.

Figure 16:
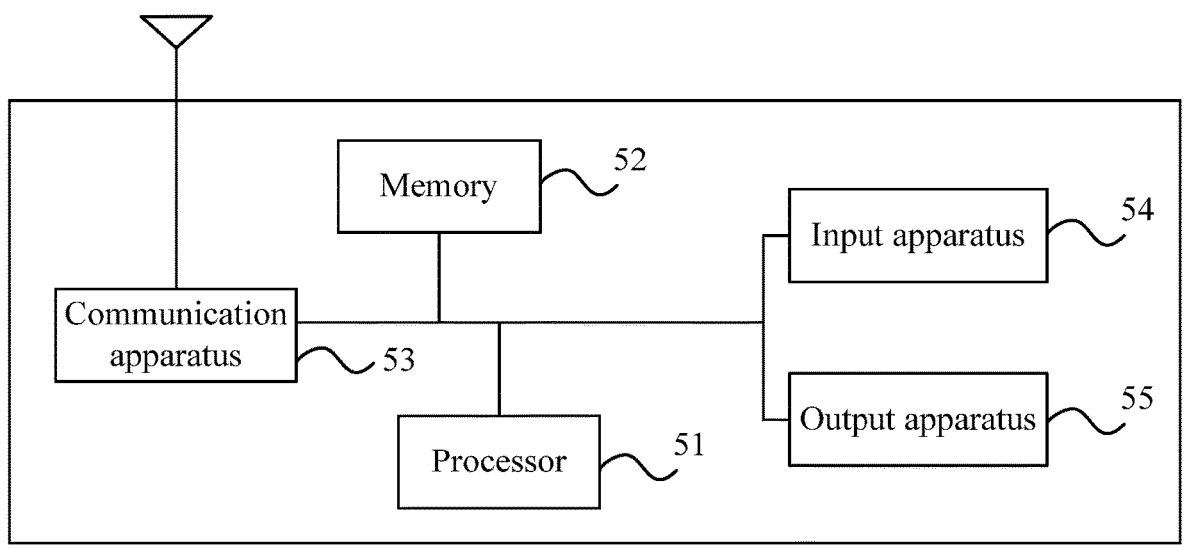
FIG. 16 is a schematic diagram illustrating a hardware structure of a communication node according to an embodiment.

An embodiment of the present application further provides a communication node. FIG. 16 is a schematic diagram illustrating a hardware structure of a communication node according to an embodiment. As shown in FIG. 16, the communication node provided in the present application includes a memory 52, a processor 51, and a computer program stored on the memory and running on the processor, where when executing the program, the processor 51 performs the channel transmission method.

The communication node may further include the memory 52; one or more processors 51 may be provided in the communication node, and one processor 51 is used as an example in FIG. 16; the memory 52 is configured to store one or more programs; when executed by the one or more processors 51, the one or more programs cause the one or more processors 51 to perform the channel transmission method or the channel reception method in the embodiments of the present application.

The communication node further includes a communication apparatus 53, an input apparatus 54, and an output apparatus 55.

The processor 51, the memory 52, the communication apparatus 53, the input apparatus 54 and the output apparatus 55 in the communication node may be connected via a bus or other means, with connection via a bus as an example in FIG. 16.

The input apparatus 54 may be configured to receive inputted digital or character information and generate key signal input related to user settings and function control of the communication node. The output apparatus 55 may include a display device, for example, a display screen.

The communication apparatus 53 may include a receiver and a transmitter. The communication apparatus 53 is configured to perform communication including information transmission and information reception under the control of the processor 51.

As a computer-readable storage medium, the memory 52 may be configured to store software programs, computer-executable programs, and modules such as program instructions/modules corresponding to the channel transmission method described in the embodiments of the present application (for example, the first determination module 310 and the transmission module 320 in the channel transmission apparatus). The memory 52 may include a program storage region and a data storage region, where the program storage region may store an operating system and an application program required by at least one function while the data storage region may store data created depending on use of the communication node. Additionally, the memory 52 may include a high-speed random-access memory and may further include a non-volatile memory, for example, at least one magnetic disk memory and flash memory or other non-volatile solid-state memories. In some examples, the memory 52 may further include memories located remotely relative to the processors 51, and these remote memories may be connected to the communication node via a network. Examples of the preceding network include, but are not limited to, the Internet, an intranet, a local area network, a mobile communication network and a combination thereof.

An embodiment of the present application further provides a storage medium, which is configured to store a computer program which, when executed by a processor, performs the channel transmission method or the channel reception method of any one of the embodiments of the present application.

The channel transmission method includes the following.

A PUCCH frequency hopping pattern is determined, where the PUCCH frequency hopping pattern is one of preset frequency hopping patterns, and the preset frequency hopping patterns include at least two types of frequency hopping patterns; where in a first-type frequency hopping pattern, a PUCCH before and after hopping occupies adjacent time domain symbols, and in a second-type frequency hopping pattern, an interval exists between time domain symbols occupied by the PUCCH before and after the hopping; and a PUCCH corresponding to the PUCCH frequency hopping pattern is transmitted according to the PUCCH frequency hopping pattern.

The channel reception method includes the following.

A PUCCH frequency hopping pattern is determined, where the PUCCH frequency hopping pattern is one of preset frequency hopping patterns, and the preset frequency hopping patterns include at least two types of frequency hopping patterns; where in a first-type frequency hopping pattern, a PUCCH before and after hopping occupies adjacent time domain symbols, and in a second-type frequency hopping pattern, an interval exists between time domain symbols occupied by the PUCCH before and after the hopping; and a PUCCH corresponding to the PUCCH frequency hopping pattern is received according to the PUCCH frequency hopping pattern.

A computer storage medium in the embodiments of the present application may use any combination of one or more computer-readable media. A computer-readable medium may be a computer-readable signal medium or a computer-readable storage medium. The computer-readable storage medium may be, for example, but is not limited to, an electrical, magnetic, optical, electromagnetic, infrared or semiconductor system, apparatus or device, or any combination thereof. More specific examples of the computer-readable storage medium include (non-exhaustive list): an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage element, a magnetic storage device, or any suitable combination thereof. The computer-readable storage medium may be any tangible medium including or storing a program. The program may be used by or used in conjunction with an instruction execution system, apparatus, or element.

The computer-readable signal medium may include a data signal propagated in a baseband or as part of a carrier. The data signal carries computer-readable program codes. The data signal propagated in this manner may be in multiple forms and includes, and is not limited to, an electromagnetic signal, an optical signal, or any suitable combination thereof. The computer-readable signal medium may further be any computer-readable medium other than a computer-readable storage medium. The computer-readable medium may send, propagate, or transmit the program used by or used in conjunction with the instruction execution system, apparatus, or element.

The program codes included on the computer-readable medium may be transmitted on any suitable medium including, but not limited to, a wireless medium, a wire, an optical cable, a radio frequency (RF) and the like or transmitted on any suitable combination thereof.

Computer program codes for performing operations of the present application may be written in one or more programming languages or a combination of multiple programming languages. The programming languages include object-oriented programming languages such as Java, Smalltalk, and C++ and conventional procedural programming languages such as C language or similar programming languages. The program codes may be executed entirely on a user computer, partly on the user computer, as a stand-alone software package, partly on the user computer and partly on a remote computer, or entirely on the remote computer or a server. In a case related to the remote computer, the remote computer may be connected to the user computer via any type of network including a local area network (LAN) or a wide area network (WAN) or may be connected to an external computer (for example, via the Internet through an Internet service provider).

The above are only exemplary embodiments of the present application and are not intended to limit the scope of the present application.

It is to be understood by those skilled in the art that the term "user terminal" covers any suitable type of radio UE, for example, a mobile phone, a portable data processing apparatus, a portable web browser or a vehicle-mounted mobile station.

In general, multiple embodiments of the present application may be implemented in hardware, dedicated circuits, software, logics or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, such as, but not limited to, a read-only memory (ROM), a random-access memory (RAM) and an optical memory device and system (a digital video disc (DVD) or a compact disk (CD)). The computer-readable medium may include a non-transitory storage medium. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A method for wireless communication, comprising:
   determining, by a user equipment (UE) in a Radio Resource Control (RRC) inactive state, a paging resource for monitoring a radio access network (RAN) paging and a core network (CN) paging,
      wherein a discontinuous reception (DRX) cycle applicable in an RRC idle state is used in the RRC inactive state for a calculation of the paging resource,
      wherein the paging resource comprises a paging subframe or a paging narrowband,
      wherein, for the calculation of at least one of the paging subframe and the paging narrowband, the DRX cycle of the UE in the RRC inactive state is 512 radio frames in response to a paging extended DRX information being configured with 512 radio frames, and
      wherein the paging extended DRX information is configured by a non-access stratum (NAS) signaling and not including a paging time window (PTW); and
   monitoring, by the UE in the RRC inactive state, both the RAN paging and the CN paging.

2. The method of claim 1, wherein for the calculation of at least one of the paging subframe or the paging narrowband, the DRX cycle of the UE in the RRC inactive state is determined by a shortest of a UE-specific paging cycle if configured by an upper layer, and a default paging cycle.

3. The method of claim 1, wherein for a calculation of a paging frame, a DRX cycle in the RRC inactive state is determined based on a shortest among a RAN paging cycle, a UE-specific paging cycle if assigned by an upper layer, and a default paging cycle in response to the paging extended DRX information not being configured.

4. The method of claim 3, wherein, in response to the paging extended DRX information being configured by an upper layer, which is configured by NAS and includes the PTW, the DRX cycle in the RRC inactive state within the PTW is determined by the shortest cycle among the UE-specific paging cycle and the default paging cycle, the DRX cycle in the RRC inactive state outside the PTW is determined based on a RAN paging cycle.

5. A device for wireless communication implemented as a User Equipment (UE) operable in a Radio Resource Control (RRC) inactive state, comprising a processor and a memory, wherein the processor is configured to read code from the memory and implement operations comprising:
   determine a paging resource for monitoring a radio access network (RAN) paging and a core network (CN) paging,
      wherein a discontinuous reception (DRX) cycle applicable in an RRC idle state is used in the RRC inactive state for a calculation of the paging resource,
      wherein the paging resource comprises a paging subframe or a paging narrowband,
      wherein, for the calculation of at least one of the paging subframe and the paging narrowband, the DRX cycle of the UE in the RRC inactive state is 512 radio frames in response to a paging extended DRX information being configured with 512 radio frames, and
      wherein the paging extended DRX information is configured by a non-access stratum (NAS) signaling and not including a paging time window (PTW); and
   monitor both the RAN paging and the CN paging.

6. The device of claim 5, wherein, for the calculation of at least one of the paging subframe and the paging narrowband, the DRX cycle of the UE in the RRC inactive state is determined by a shortest of a UE-specific paging cycle if configured by an upper layer, and a default paging cycle.

7. The device of claim 5, wherein, for a calculation of a paging frame, a DRX cycle in the RRC inactive state is determined based on a shortest among a RAN paging cycle, a UE-specific paging cycle if assigned by an upper layer, and a default paging cycle in response to the paging extended DRX information not being configured.

8. The device of claim 7, wherein, in response to the paging extended DRX information being configured by an upper layer, which is configured by NAS and includes the PTW, the DRX cycle in the RRC inactive state within the PTW is determined by the shortest cycle among the UE-specific paging cycle and the default paging cycle, the DRX cycle in the RRC inactive state outside the PTW is determined based on a RAN paging cycle.

9. A non-transitory computer readable program storage medium used for a user equipment, UE, in a Radio Resource Control, RRC, inactive state, having code stored thereon, the code, when executed by a processor, causing the processor to implement operations that comprises:
   determining a paging resource for monitoring a radio access network (RAN) paging and a core network (CN) paging,
      wherein a discontinuous reception (DRX) cycle applicable in an RRC idle state is used in the RRC inactive state for a calculation of the paging resource,
      wherein the paging resource comprises a paging subframe or a paging narrowband,
      wherein, for the calculation of at least one of the paging subframe and the paging narrowband, the DRX cycle of the UE in the RRC inactive state is 512 radio frames in response to a paging extended DRX information being configured with 512 radio frames, and
      wherein the paging extended DRX information is configured by a non-access stratum (NAS) signaling and not including a paging time window (PTW); and
   monitoring both the RAN paging and the CN paging.

10. The non-transitory computer readable program storage medium of claim 9, wherein, for the calculation of at least one of the paging subframe and the paging narrowband, the DRX cycle of the UE in the RRC inactive state is determined by a shortest of a UE-specific paging cycle if configured by an upper layer, and a default paging cycle.

11. The non-transitory computer readable program storage medium of claim 9,
   wherein for a calculation of a paging frame, a DRX cycle in the RRC inactive state is determined based on a shortest among a RAN paging cycle, a UE-specific paging cycle, and a default paging cycle in response to the paging extended DRX information not being configured; and wherein in response to the paging extended DRX information being configured by an upper layer, which is configured by NAS and includes the PTW, the DRX cycle in the RRC inactive state within the PTW is determined by the shortest cycle among the UE-specific paging cycle and the default paging cycle, the DRX cycle in the RRC inactive state outside the PTW is determined based on the RAN paging cycle.

* * * * *